US007047232B1

(12) United States Patent  
Serrano

(10) Patent No.: US 7,047,232 B1
(45) Date of Patent: May 16, 2006

(54) PARALLELIZING APPLICATIONS OF SCRIPT-DRIVEN TOOLS

(75) Inventor: Martin Serrano, Lexington, MA (US)

(73) Assignee: Ab Initio Software Corporation, Lexington, MA (US)

( * ) Notice: Subject to any disclaimer, the term of this patent is extended or adjusted under 35 U.S.C. 154(b) by 0 days.

(21) Appl. No.: 09/229,849

(22) Filed: Jan. 13, 1999

(51) Int. Cl.
G06F 17/30 (2006.01)

(52) U.S. Cl. .............................. 707/3; 707/6; 709/217; 717/115

(58) Field of Classification Search ................ 707/3–5, 707/100–104.1, 1–10, 200–206; 717/144–157, 717/100, 125, 160, 115, 168, 119; 715/514, 715/900; 709/100, 217, 218, 219
See application file for complete search history.

(56) References Cited

U.S. PATENT DOCUMENTS

| 5,088,034 | A | * | 2/1992 | Ihara et al. ................. 717/160 |
| 5,151,991 | A | * | 9/1992 | Iwasawa et al. ............. 717/150 |
| 5,313,584 | A | | 5/1994 | Tickner et al. ................ 710/37 |
| 5,347,639 | A | | 9/1994 | Rechtschaffen et al. .... 712/203 |
| 5,367,619 | A | | 11/1994 | Dipaolo et al. ............. 707/506 |
| 5,446,915 | A | | 8/1995 | Pierce .......................... 712/11 |
| 5,475,842 | A | | 12/1995 | Gilbert et al. .............. 717/160 |
| 5,475,843 | A | * | 12/1995 | Halviatti et al. ............ 717/124 |
| 5,574,898 | A | * | 11/1996 | Leblang et al. ................ 707/1 |
| 5,600,833 | A | * | 2/1997 | Senn et al. ...................... 707/1 |
| 5,632,022 | A | | 5/1997 | Warren et al. .............. 345/350 |
| 5,682,537 | A | | 10/1997 | Davies et al. ............... 710/200 |
| 5,706,509 | A | | 1/1998 | Man-Hak Tso ............. 707/201 |
| 5,712,971 | A | * | 1/1998 | Stanfill et al. ................. 714/34 |
| 5,734,886 | A | | 3/1998 | Grosse et al. .................. 707/4 |
| 5,768,564 | A | * | 6/1998 | Andrews et al. ................ 717/5 |
| 5,799,149 | A | * | 8/1998 | Brenner et al. ............. 709/201 |
| 5,819,021 | A | * | 10/1998 | Stanfill et al. ................. 714/15 |
| 5,860,009 | A | | 1/1999 | Uchihira et al. ............ 717/149 |
| 5,870,743 | A | * | 2/1999 | Cohen et al. ................... 707/8 |
| 5,909,681 | A | | 6/1999 | Passera et al. ................. 707/8 |

(Continued)

FOREIGN PATENT DOCUMENTS

CA 2259362 1/1998

(Continued)

OTHER PUBLICATIONS

A User Level Program Transformation Tool, Francois Bodin et al., ACM 1998, 180-187.*

(Continued)

Primary Examiner—Shahid Alam
Assistant Examiner—Jean Bolte Fleurantin
(74) Attorney, Agent, or Firm—Fish & Richardson P.C.

(57) ABSTRACT

A system and method for parallelizing applications of script-driven software tools. Scripts in the software tool scripting language are automatically analyzed in order to produce a specification for a parallel computation plus a set of "script fragments", the combination of which is functionally equivalent to the original script. The computational specification plus the script fragments are then executed by a parallel runtime system, which causes multiple instances of the original software tool and/or supplemental programs to be run as parallel processes. The resulting processes will read input data and produce output data, performing the same computation as was specified by the original script. The combination of the analyzer, runtime system, original software tool, and supplemental programs will, for a given script and input data, produce the same output data as the original software tool alone, but has the capability of using multiple processors in parallel for substantial improvements in overall "throughput". The invention includes computer program embodiments of an automatic script analyzer.

36 Claims, 28 Drawing Sheets

U.S. PATENT DOCUMENTS

| | | | |
|---|---|---|---|
| 5,935,216 A | | 8/1999 | Benner et al. ............... 709/248 |
| 5,956,704 A | * | 9/1999 | Gautam et al. ................. 707/1 |
| 5,983,228 A | | 11/1999 | Kobayashi et al. ........... 707/10 |
| 5,999,729 A | | 12/1999 | Tabloski, Jr. et al. ....... 717/105 |
| 6,031,993 A | * | 2/2000 | Andrews et al. ................ 717/7 |
| 6,077,313 A | * | 6/2000 | Ruf ............................. 717/155 |
| 6,182,061 B1 | | 1/2001 | Matsuzawa et al. ............ 707/2 |
| 6,205,465 B1 | * | 3/2001 | Schoening et al. ......... 709/102 |
| 6,253,371 B1 | * | 6/2001 | Iwasawa et al. ............. 717/150 |
| 6,266,804 B1 | * | 7/2001 | Isman ......................... 717/125 |
| 6,295,518 B1 | * | 9/2001 | McLain et al. ............... 703/13 |
| 6,311,265 B1 | | 10/2001 | Beckerle et al. ............. 712/203 |
| 6,330,008 B1 | | 12/2001 | Razdow et al. ............. 715/772 |
| 6,415,286 B1 | | 7/2002 | Passera et al. ................. 707/6 |

FOREIGN PATENT DOCUMENTS

| | | |
|---|---|---|
| EP | 0421408 | 4/1991 |
| JP | 3-126169 | 5/1991 |
| JP | 8-16429 | 1/1996 |
| JP | 10-232875 | 9/1998 |
| JP | 10-340276 | 12/1998 |
| JP | 11-514116 | 11/1999 |
| JP | 2000148699 | 5/2000 |
| WO | WO 97/23826 | 7/1997 |

OTHER PUBLICATIONS

Torrent Technical White Paper, "ORCHESTRATOR for the SAS System—Delivering Scalability and Performance to SAS Applications", pp. 1-30.

Afrati et al., "Performance Considerations on a Random Graph Model for Parellel Processing", Informatique Theorique et Applications, vol. 27, No. 4, pp: 367-388, (1993).

Apers et al., "PRISMA/DB: A Parallel, Main Memory Relational DBMS", IEEE, pp: 541-554 (1992).

Boral et al., "Prototyping Bubba: A Highly Parallel Database System", IEEE, vol. 2, No. 1 pp: 4-24, (Mar. 1990).

Braun, Peter, "Parallel Program Debugging Using Scalable Visualization",IEEE, pp: 699-708 (1995).

DeWitt et al., "The Gamma Database Machine Project", IEEE, vol. 2, No. 1, pp: 44-62, (Mar. 1990).

Graefe et al., "Encapsulation of Parellelism and Architecture Independence in Extensible Database Query Execution", IEEE, vol. 19, No. 8, pp: 749-764 (Aug. 1993).

Graefe, Goetze "Volcano—An Extensible and Parellel Query Evaluation System", IEEE, vol. 6, No. 1, pp: 120-135 (Feb. 1994).

Li et al., "Load Balancing Problems for Multiclass Jobs in Distributed/Parellel Computer Systems", IEEE, vol. 47, No. 3, pp: 322-332, (Mar. 1998).

Rim et al., "An Efficient Dynamic Load Balancing Using the Dimension Exchange Method for Balancing Quantized Loads on Hypercube Multiprocessors", IEEE, pp: 708-712 (1999).

Stanfill, Craig, "Massively Parallel Information Retrieval for Wide Area Information Servers", IEEE, pp: 679-682 (1991).

Stanfill, Craig, "The Marriage of Parallel Computing and Information Retrieval", IEEE, (2003).

* cited by examiner

| | NAME | CLASS | FILE | EXPLICIT? |
|---|---|---|---|---|
| 201 | INDATA1 | INPUT | INPUT1.DAT | YES |
| 202 | INDATA2 | INPUT | INPUT2.DAT | YES |
| 208 | OUTDATA | OUTPUT | OUTPUT.DAT | YES |
| 204 | TEMP1 | TEMP | | NO |
| 206 | TEMP2 | TEMP | | NO |

DATA SET TABLE  601

| | NAME | OPERATION | PARAMETERS (EXCEPTING DATA SETS) |
|---|---|---|---|
| 203 | STEP1 | CONCATENATE | |
| 205 | STEP2 | AGGREGATE | o1=MIN v1, o2=MAX v1, o3=AVG v1 BY v2,v3 |
| 207 | STEP3 | ANALYZE | |

PROCESSING STEP TABLE  602

| | STEP | DATA SET | DIRECTION | ROLE |
|---|---|---|---|---|
| 220 | STEP1 | INDATA1 | INPUT | IN |
| 221 | STEP1 | INDATA2 | INPUT | IN |
| 222 | STEP1 | TEMP1 | OUTPUT | OUT |
| 223 | STEP2 | TEMP1 | INPUT | IN |
| 224 | STEP2 | TEMP2 | OUTPUT | OUT |
| 225 | STEP3 | TEMP2 | INPUT | IN |
| 226 | STEP3 | OUTDATA | OUTPUT | OUT |

DATA SET ACCESS TABLE  603

*FIG. 6*

PARALLEL DATA SET TABLE (INITIAL) 801

| NAME | CLASS | FILE | EXPLICIT? | PARTITIONING |
|---|---|---|---|---|
| 201 — INDATA1 | INPUT | INPUT1.DAT | YES | SERIAL |
| 202 — INDATA2 | INPUT | INPUT2.DAT | YES | SERIAL |
| 208 — OUTDATA | OUTPUT | OUTPUT.DAT | YES | SERIAL |
| 204 — TEMP1 | TEMP | | NO | |
| 206 — TEMP2 | TEMP | | NO | |

PARALLEL PROCESSING STEP TABLE (INITIAL) 802

| NAME | OPERATION | PARAMETERS (EXCEPTING DATA SETS) | PARTITIONING |
|---|---|---|---|
| 203 — STEP1 | CONCATENATE | | |
| 205 — STEP2 | AGGREGATE | o1=MIN v1, o2=MAX v1, o3=AVG v1 BY v2,v3 | |
| 207 — STEP3 | ANALYZE | | |

PARALLEL DATA SET ACCESS TABLE (INITIAL) 803

| STEP | DATA SET | DIRECTION | ROLE | PARTITIONING |
|---|---|---|---|---|
| 220 — STEP1 | INDATA1 | INPUT | IN | |
| 221 — STEP1 | INDATA2 | INPUT | IN | |
| 222 — STEP1 | TEMP1 | OUTPUT | OUT | |
| 223 — STEP2 | TEMP1 | INPUT | IN | |
| 224 — STEP2 | TEMP2 | OUTPUT | OUT | |
| 225 — STEP3 | TEMP2 | INPUT | IN | |
| 226 — STEP3 | OUTDATA | OUTPUT | OUT | |

FIG. 10

PARALLEL DATA SET TABLE _801_

| NAME | CLASS | FILE | EXPLICIT? | PARTITIONING |
|---|---|---|---|---|
| INDATA1 | INPUT | INPUT1.DAT | YES | SERIAL |
| INDATA2 | INPUT | INPUT2.DAT | YES | SERIAL |
| OUTDATA | OUTPUT | OUTPUT.DAT | YES | SERIAL |
| TEMP1 | TEMP | | NO | |
| TEMP2 | TEMP | | NO | |

(201, 202, 208, 204, 206)

PARALLEL PROCESSING STEP TABLE _802_

| NAME | OPERATION | PARAMETERS (EXCEPTING DATA SETS) | PARTITIONING |
|---|---|---|---|
| STEP1 | CONCATENATE | | SIMPLE |
| STEP2 | AGGREGATE | $o1=MIN\ v1, o2=MAX\ v1, o3=AVG\ v1$ BY $v2,v3$ | BY $v2,v3$ |
| STEP3 | ANALYZE | | SERIAL |

(203, 205, 207)

PARALLEL DATA SET ACCESS TABLE _803_

| STEP | DATA SET | DIRECTION | ROLE | PARTITIONING |
|---|---|---|---|---|
| STEP1 | INDATA1 | INPUT | IN | SIMPLE |
| STEP1 | INDATA2 | INPUT | IN | SIMPLE |
| STEP1 | TEMP1 | OUTPUT | OUT | SIMPLE |
| STEP2 | TEMP1 | INPUT | IN | BY $v2,v3$ |
| STEP2 | TEMP2 | OUTPUT | OUT | BY $v2,v3$ |
| STEP3 | TEMP2 | INPUT | IN | SERIAL |
| STEP3 | OUTDATA | OUTPUT | OUT | SERIAL |

| | NAME | CLASS | FILE | EXPLICIT? | PARTITIONING |
|---|---|---|---|---|---|
| 201 | INDATA1 | INPUT | INPUT1.DAT | YES | SERIAL |
| 202 | INDATA2 | INPUT | INPUT2.DAT | YES | SERIAL |
| 208 | OUTDATA | OUTPUT | OUTPUT.DAT | YES | SERIAL |
| 204 | TEMP1 | TEMP | | NO | SIMPLE |
| 206 | TEMP2 | TEMP | | NO | |
| 212 | TEMP3 | TEMP | | NO | SIMPLE |
| 213 | TEMP4 | TEMP | | NO | SIMPLE |

PARALLEL DATA SET TABLE  801

| | NAME | OPERATION | PARAMETERS (EXCEPTING DATA SETS) | PARTITIONING |
|---|---|---|---|---|
| 210 | STEP1A | SIMPLE-PARTITION | | SERIAL |
| 211 | STEP2B | SIMPLE-PARTITION | | SERIAL |
| 203 | STEP1 | CONCATENATE | | SIMPLE |
| 205 | STEP2 | AGGREGATE | o1=MIN v1, o2=MAX v1, o3=AVG v1 BY v2,v3 | BY v2, v3 |
| 207 | STEP3 | ANALYZE | | SERIAL |

PARALLEL PROCESSING STEP TABLE  802

| | STEP | DATA SET | DIRECTION | ROLE | PARTITIONING |
|---|---|---|---|---|---|
| 227 | STEP1A | INDATA1 | INPUT | IN | SERIAL |
| 228 | STEP1A | TEMP3 | OUTPUT | OUT | SIMPLE |
| 229 | STEP1B | INDATA2 | INPUT | IN | SERIAL |
| 230 | STEP1B | TEMP4 | OUTPUT | OUT | SIMPLE |
| 220 | STEP1 | TEMP3 | INPUT | IN | SIMPLE |
| 221 | STEP1 | TEMP4 | INPUT | IN | SIMPLE |
| 222 | STEP1 | TEMP1 | OUTPUT | OUT | SIMPLE |
| 223 | STEP2 | TEMP1 | INPUT | IN | BY v2, v3 |
| 224 | STEP2 | TEMP2 | OUTPUT | OUT | BY v2, v3 |
| 225 | STEP3 | TEMP2 | INPUT | IN | SERIAL |
| 226 | STEP3 | OUTDATA | OUTPUT | OUT | SERIAL |

PARALLEL DATA SET ACCESS TABLE  803

FIG. 13

| NAME | CLASS | FILE | EXPLICIT? | PARTITIONING |
|---|---|---|---|---|
| 201 — INDATA1 | INPUT | INPUT1.DAT | YES | SERIAL |
| 202 — INDATA2 | INPUT | INPUT2.DAT | YES | SERIAL |
| 208 — OUTDATA | OUTPUT | OUTPUT.DAT | YES | SERIAL |
| 204 — TEMP1 | TEMP | | NO | SIMPLE |
| 206 — TEMP2 | TEMP | | NO | BY v2,v3 |
| 212 — TEMP3 | TEMP | | NO | SIMPLE |
| 213 — TEMP4 | TEMP | | NO | SIMPLE |
| 215 — TEMP5 | TEMP | | NO | BY v2,v3 |

PARALLEL DATA SET TABLE  801

| NAME | OPERATION | PARAMETERS (EXCEPTING DATA SETS) | PARTITIONING |
|---|---|---|---|
| 210 — STEP1A | SIMPLE-PARTITION | | SERIAL |
| 211 — STEP1B | SIMPLE-PARTITION | | SERIAL |
| 203 — STEP1 | CONCATENATE | | SIMPLE |
| 214 — STEP2A | HASH-PARTITION | BY v2,v3 | SIMPLE |
| 205 — STEP2 | AGGREGATE | O1=MIN v1, O2=MAX v1, O3=AVG v1 BY v2,v3 | BY v2, v3 |
| 207 — STEP3 | ANALYZE | | SERIAL |

PARALLEL PROCESSING STEP TABLE  802

| STEP | DATA SET | DIRECTION | ROLE | PARTITIONING |
|---|---|---|---|---|
| 227 — STEP1A | INDATA1 | INPUT | IN | SERIAL |
| 228 — STEP1A | TEMP3 | OUTPUT | OUT | SIMPLE |
| 229 — STEP1B | INDATA2 | INPUT | IN | SERIAL |
| 230 — STEP1B | TEMP4 | OUTPUT | OUT | SIMPLE |
| 220 — STEP1 | TEMP3 | INPUT | IN | SIMPLE |
| 221 — STEP1 | TEMP4 | INPUT | IN | SIMPLE |
| 222 — STEP1 | TEMP1 | OUTPUT | OUT | SIMPLE |
| 231 — STEP2A | TEMP1 | INPUT | IN | SIMPLE |
| 232 — STEP2A | TEMP5 | OUTPUT | OUT | BY v2,v3 |
| 223 — STEP2 | TEMP5 | INPUT | IN | BY v2, v3 |
| 224 — STEP2 | TEMP2 | OUTPUT | OUT | BY v2,v3 |
| 225 — STEP3 | TEMP2 | INPUT | IN | SERIAL |
| 226 — STEP3 | OUTDATA | OUTPUT | OUT | SERIAL |

PARALLEL DATA SET ACCESS TABLE  803

FIG. 14

801 — PARALLEL DATA SET TABLE

| | NAME | CLASS | FILE | EXPLICIT? | PARTITIONING |
|---|---|---|---|---|---|
| 201 | INDATA1 | INPUT | INPUT1.DAT | YES | SERIAL |
| 202 | INDATA2 | INPUT | INPUT2.DAT | YES | SERIAL |
| 208 | OUTDATA | OUTPUT | OUTPUT.DAT | YES | SERIAL |
| 204 | TEMP1 | TEMP | | NO | SIMPLE |
| 206 | TEMP2 | TEMP | | NO | BY v2, v3 |
| 212 | TEMP3 | TEMP | | NO | SIMPLE |
| 213 | TEMP4 | TEMP | | NO | SIMPLE |
| 215 | TEMP5 | TEMP | | NO | BY v2, v3 |
| 217 | TEMP6 | TEMP | | NO | SERIAL |

802 — PARALLEL PROCESSING STEP TABLE

| | NAME | OPERATION | PARAMETERS (EXCEPTING DATA SETS) | PARTITIONING |
|---|---|---|---|---|
| 210 | STEP1A | SIMPLE-PARTITION | | SERIAL |
| 211 | STEP1B | SIMPLE-PARTITION | | SERIAL |
| 203 | STEP1 | CONCATENATE | | SIMPLE |
| 214 | STEP2A | HASH-PARTITION | BY v2,v3 | SIMPLE |
| 205 | STEP2 | AGGREGATE | o1=MIN v1, o2=MAX v1, o3=AVG v1 BY v2,v3 | BY v2, v3 |
| 216 | STEP3A | GATHER | | SERIAL |
| 207 | STEP3 | ANALYZE | | SERIAL |

803 — PARALLEL DATA SET ACCESS TABLE

| | STEP | DATA SET | DIRECTION | ROLE | PARTITIONING |
|---|---|---|---|---|---|
| 227 | STEP1A | INDATA1 | INPUT | IN | SERIAL |
| 228 | STEP1A | TEMP3 | OUTPUT | OUT | SIMPLE |
| 229 | STEP1B | INDATA2 | INPUT | IN | SERIAL |
| 230 | STEP1B | TEMP4 | OUTPUT | OUT | SIMPLE |
| 220 | STEP1 | TEMP3 | INPUT | IN | SIMPLE |
| 221 | STEP1 | TEMP4 | INPUT | IN | SIMPLE |
| 222 | STEP1 | TEMP1 | OUTPUT | OUT | SIMPLE |
| 231 | STEP2A | TEMP1 | INPUT | IN | SIMPLE |
| 232 | STEP2A | TEMP5 | OUTPUT | OUT | BY v2,v3 |
| 223 | STEP2 | TEMP5 | INPUT | IN | BY v2,v3 |
| 224 | STEP2 | TEMP2 | OUTPUT | OUT | BY v2,v3 |
| 233 | STEP3A | TEMP2 | INPUT | IN | BY v2,v3 |
| 234 | STEP3A | TEMP6 | OUTPUT | OUT | SERIAL |
| 225 | STEP3 | TEMP6 | INPUT | IN | SERIAL |
| 226 | STEP3 | OUTDATA | OUTPUT | OUT | SERIAL |

FIG. 15

```
SCRIPT 1:                                           2101
  INPUT INDATA1 $1
  INPUT INDATA2 $2
  CONCATENATE indata1 indata2
  OUTPUT outdata $3

SCRIPT 2:                                           2102
  INPUT indata 1 $1
  AGGREGATE o1=min v1, o2=max v2, o3=avg v1 BY v2,v3
  OUTPUT outdata $2

SCRIPT 3:                                           2103
  INPUT indata $1
  ANALYZE
  OUTPUT outdata $2
                                                       4
```

FIG. 17

PARALLEL DATA SET TABLE _801_

| | NAME | CLASS | FILE | EXPLICIT? | PARTITIONING |
|---|---|---|---|---|---|
| 201 | INDATA1 | INPUT | INPUT1.DAT | YES | SERIAL |
| 202 | INDATA2 | INPUT | INPUT2.DAT | YES | SERIAL |
| 208 | OUTDATA | OUTPUT | OUTPUT.DAT | YES | SERIAL |
| 204 | TEMP1 | TEMP | | NO | SIMPLE |
| 206 | TEMP2 | TEMP | | NO | BY v2,v3 |
| 212 | TEMP3 | TEMP | | NO | SIMPLE |
| 213 | TEMP4 | TEMP | | NO | SIMPLE |
| 215 | TEMP5 | TEMP | | NO | BY v2,v3 |
| 217 | TEMP6 | TEMP | | NO | SERIAL |

PARALLEL PROCESSING STEP TABLE _802_

| | NAME | OPERATION | PARAMETERS (EXCEPTING DATA SETS) |
|---|---|---|---|
| 210 | STEP1A | SIMPLE-PARTITION | |
| 211 | STEP1B | SIMPLE-PARTITION | |
| 203 | STEP1 | RUN ANALYZE | SCRIPT1 |
| 214 | STEP2A | HASH-PARTITION | BY v2,v3 |
| 205 | STEP2 | RUN ANALYZE | SCRIPT2 |
| 216 | STEP3A | GATHER | |
| 207 | STEP3 | RUN ANALYZE | SCRIPT3 |

PARALLEL DATA SET ACCESS TABLE _803_

| | STEP | DATA SET | DIRECTION | ROLE | PARTITIONING |
|---|---|---|---|---|---|
| 227 | STEP1A | INDATA1 | INPUT | IN | SERIAL |
| 228 | STEP1A | TEMP3 | OUTPUT | OUT | SIMPLE |
| 229 | STEP1B | INDATA2 | INPUT | IN | SERIAL |
| 230 | STEP1B | TEMP4 | OUTPUT | OUT | SIMPLE |
| 220 | STEP1 | TEMP3 | INPUT | IN | SIMPLE |
| 221 | STEP1 | TEMP4 | INPUT | IN | SIMPLE |
| 222 | STEP1 | TEMP1 | OUTPUT | OUT | SIMPLE |
| 231 | STEP2A | TEMP1 | INPUT | IN | SIMPLE |
| 232 | STEP2A | TEMP5 | OUTPUT | OUT | BY v2,v3 |
| 223 | STEP2 | TEMP5 | INPUT | IN | BY v2,v3 |
| 224 | STEP2 | TEMP2 | OUTPUT | OUT | BY v2,v3 |
| 233 | STEP3A | TEMP2 | INPUT | IN | BY v2,v3 |
| 234 | STEP3A | TEMP6 | OUTPUT | OUT | SERIAL |
| 225 | STEP3 | TEMP6 | INPUT | IN | SERIAL |
| 226 | STEP3 | OUTDATA | OUTPUT | OUT | SERIAL |

PARALLEL DATA SET TABLE (801)

| | NAME | CLASS | FILE | EXPLICIT? | PARTITIONING |
|---|---|---|---|---|---|
| 201 | INDATA1 | INPUT | INPUT1.DAT | YES | SERIAL |
| 202 | INDATA2 | INPUT | INPUT2.DAT | YES | SERIAL |
| 208 | OUTDATA | OUTPUT | OUTPUT.DAT | YES | SERIAL |
| 204 | TEMP1 | TEMP | TEMP1.1;TEMP1.2 | NO | SIMPLE |
| 206 | TEMP2 | TEMP | TEMP2.1;TEMP2.2 | NO | BY v2,v3 |
| 212 | TEMP3 | TEMP | TEMP3.1;TEMP3.2 | NO | SIMPLE |
| 213 | TEMP4 | TEMP | TEMP4.1;TEMP4.2 | NO | SIMPLE |
| 215 | TEMP5 | TEMP | TEMP5.1;TEMP5.2 | NO | BY v2,v3 |
| 217 | TEMP6 | TEMP | TEMP6 | NO | SERIAL |

PARALLEL PROCESSING STEP TABLE (802)

| | NAME | OPERATION | PARAMETERS (EXCEPTING DATA SETS) | PARTITIONING |
|---|---|---|---|---|
| 210 | STEP1A | SIMPLE-PARTITION | | SERIAL |
| 211 | STEP1B | SIMPLE-PARTITION | | SIMPLE |
| 203 | STEP1 | RUN ANALYZE | SCRIPT1 | SIMPLE |
| 214 | STEP2A | HASH-PARTITION | BY v2,v3 | SIMPLE |
| 205 | STEP2 | RUN ANALYZE | SCRIPT2 | BY v2, v3 |
| 216 | STEP3A | GATHER | | SERIAL |
| 207 | STEP3 | RUN ANALYZE | SCRIPT3 | SERIAL |

PARALLEL DATA SET ACCESS TABLE (803)

| | STEP | DATA SET | DIRECTION | ROLE | PARTITIONING |
|---|---|---|---|---|---|
| 227 | STEP1A | INDATA1 | INPUT | IN | SERIAL |
| 228 | STEP1A | TEMP3 | OUTPUT | OUT | SIMPLE |
| 229 | STEP1B | INDATA2 | INPUT | IN | SERIAL |
| 230 | STEP1B | TEMP4 | OUTPUT | OUT | SIMPLE |
| 220 | STEP1 | TEMP3 | INPUT | IN | SIMPLE |
| 221 | STEP1 | TEMP4 | INPUT | IN | SIMPLE |
| 222 | STEP1 | TEMP1 | OUTPUT | OUT | SIMPLE |
| 231 | STEP2A | TEMP1 | INPUT | IN | SIMPLE |
| 232 | STEP2A | TEMP5 | OUTPUT | OUT | BY v2,v3 |
| 223 | STEP2 | TEMP5 | INPUT | IN | BY v2,v3 |
| 224 | STEP2 | TEMP2 | OUTPUT | OUT | BY v2,v3 |
| 233 | STEP3A | TEMP2 | INPUT | IN | BY v2,v3 |
| 234 | STEP3A | TEMP6 | OUTPUT | OUT | SERIAL |
| 225 | STEP3 | TEMP6 | INPUT | IN | SERIAL |
| 226 | STEP3 | OUTDATA | OUTPUT | OUT | SERIAL |

| | | |
|---|---|---|
| SIMPLE-PARTITION | | INPUT1.DAT | TEMP3.1;TEMP 3.2 |
| SIMPLE-PARTITION | | INPUT2.DAT | TEMP4.1;TEMP 4.2 |
| RUN ANALYZE | SCRIPT1 | TEMP3.1;TEMP 3.2 | TEMP4.1;TEMP 4.2 TEMP 1.1;TEMP 1.2 |
| HASH-PARTITION | v1,v2 | TEMP1.1;TEMP 1.2 | TEMP5.1;TEMP 5.2 |
| RUN ANALYZE | SCRIPT2 | TEMP5.1;TEMP 5.2 | TEMP2.1;TEMP 2.2 |
| GATHER | | TEMP2.1;TEMP 2.2 | TEMP6 |
| RUN ANALYZE | SCRIPT3 | TEMP6 | OUTPUT.DAT |

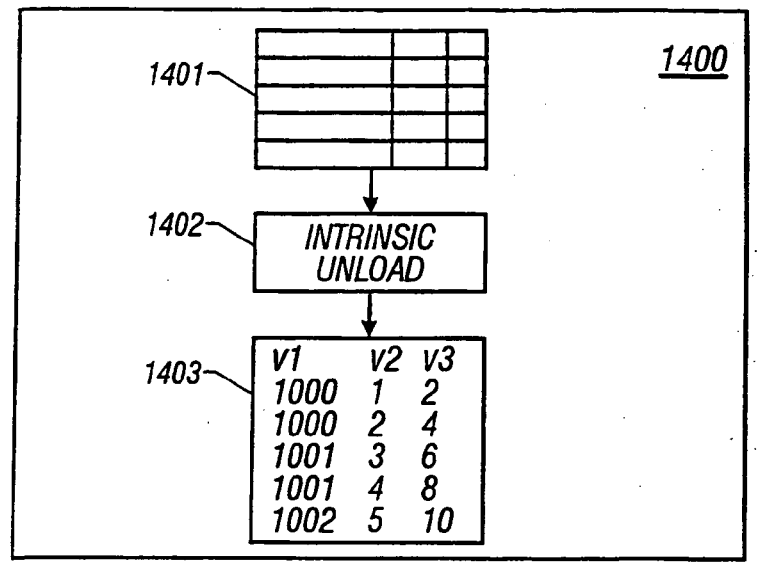
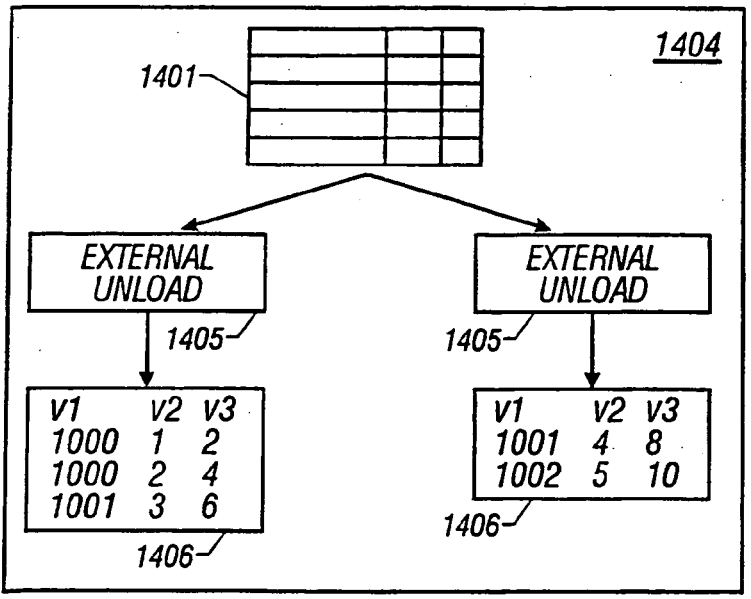
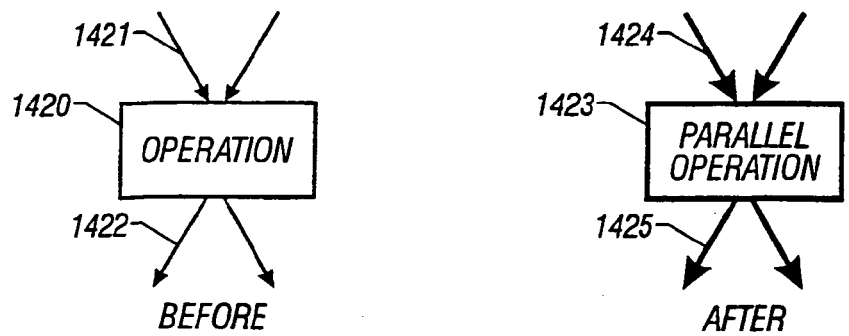
FIG. 26

PARALLELIZING APPLICATIONS OF SCRIPT-DRIVEN TOOLS

NOTICE OF COPYRIGHTS

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

TECHNICAL FIELD

The invention relates to the control of computations in data processing systems and, more particularly, to parallelizing applications of script-driven tools.

BACKGROUND

Computational speeds of single processor computers have advanced tremendously over the past three decades. However, many fields require computational capacity that exceeds even the fastest single processor computer. An example is in transactional processing, where multiple users access computer resources concurrently, and where response times must be low for the system to be commercially acceptable. Another example is in database mining, where hundreds of gigabytes of information must be processed, and where processing data on a serial computer might take days or weeks. Accordingly, a variety of "parallel processing" systems have been developed to handle such problems. For purposes of this discussion, parallel processing systems include any configuration of computer systems using multiple central processing units (CPUs), either local (e.g., multiprocessor systems such as SMP computers), or locally distributed (e.g., multiple processors coupled as clusters or MPPs), or remotely, or remotely distributed (e.g., multiple processors coupled via LAN or WAN networks), or any combination thereof.

However, despite the existence of such parallel processing systems, not all programs or software tools are designed to take advantage of parallel processing. For example, several commercially important software tools share the following characteristics:

- The software tool is capable of performing a variety of functions.
- The invocation of those functions is controlled by a "scripting language" which specifies a series of processing steps and the interchange of data between those processing steps.
- Users write applications using the combination of the tool and its scripting language.
- The software tool makes no or minimal use of parallel processing.

One example of such a software tool is the "SAS® Software System", a data analysis system produced by the SAS Institute, Inc. The functions provided by this tool include data transformation, data aggregation, dataset management, and a wide variety of statistical procedures. Users build SAS applications by writing scripts in a language which is also called "SAS". A second example of such a tool is "SyncSort®" produced by Syncsort Inc. The functions provided by this application include data filtering, data sorting, and data aggregation. Users build "Syncsort" applications by writing "Syncsort" scripts.

When applications built with such software tools are used to process large quantities of data, execution times can become quite large. Parallel processing, in which large numbers of processors can be applied to a single application, has the potential to speed up such data-intensive applications. Ideally, a job which took 10 hours running on a single processor might take as little as 10 minutes running on 60 processors. Such a performance improvement is, of course, dependent on having software which is capable of utilizing the parallel processing system.

Users of these software tools are not, in most cases, willing to learn how to use a new and/or different tool or to modify existing applications of the tool. For example, a user of SAS generally would not be willing to learn an entirely new scripting language or to modify existing SAS applications. In order to bring the benefits of parallelism to such users, the inventor has determined that it would be desirable to automatically parallelize applications of the tool, as expressed in the scripting language.

SUMMARY

The invention includes a system and method for parallelizing applications of certain script-driven software tools. In the preferred embodiment, scripts in the software tool scripting language are automatically analyzed in order to produce a specification for a parallel computation plus a set of "script fragments", the combination of which is functionally equivalent to the original script. The parallel computation specification plus the script fragments are then executed by a parallel runtime system, which causes multiple instances of the original software tool and/or supplemental programs to be run as parallel processes. The resulting processes will read input data and produce output data, performing the same computation as was specified by the original script. The combination of the analyzer, runtime system, original software tool, and supplemental programs will, for a given script and input data, produce the same output data as the original software tool alone, but has the capability of using multiple processors in parallel for substantial improvements in overall "throughput".

In one aspect, the invention includes a method, system, and computer program for parallelizing a computer application program based on a script of a script-driven software tool, comprising automatically analyzing the script and producing a parallel computation specification based on such analysis, where such parallel computation specification provides functional equivalence to the script when executed by a parallel runtime system. In another aspect, the invention includes a method, system, and computer program for parallelizing a computer application program based on a script of a script-driven software tool, comprising automatically analyzing the script and producing a parallel computation specification plus a script fragment set based on such analysis, where such parallel computation specification and script fragment set provides functional equivalence to the script when executed by a parallel runtime system.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 6 is a diagram showing examples of dataset table, processing step, and dataset access tables.

FIG. 10 is a diagram showing examples of initial parallel dataset, processing step, and data access tables.

FIG. 11 is a diagram showing the parallel dataset, processing step, and dataset access tables of FIG. 10 after parallelization but before resolution of conflicts.

FIG. 13 is a diagram showing FIG. 11 after resolution of Application Step 1 of the parallel processing step table.

FIG. 14 is a diagram showing FIG. 13 after resolution of Application Step 2 of the parallel processing step table.

FIG. 15 is a diagram showing FIG. 14 after resolution of Application Step 3 of the parallel processing step table.

FIG. 17 shows an example of a script fragment file containing several scripts.

FIG. 18 is a diagram showing FIG. 15 after generation of script fragments.

FIG. 20 is a diagram showing the generation of temporary datasets.

FIG. 21 is a diagram showing the final parallel computation specification 3.

FIG. 26 is a dataflow diagram showing an example of External Parallelism.

Like reference numbers and designations in the various drawings indicate like elements.

DETAILED DESCRIPTION

Overview

Figure 1:
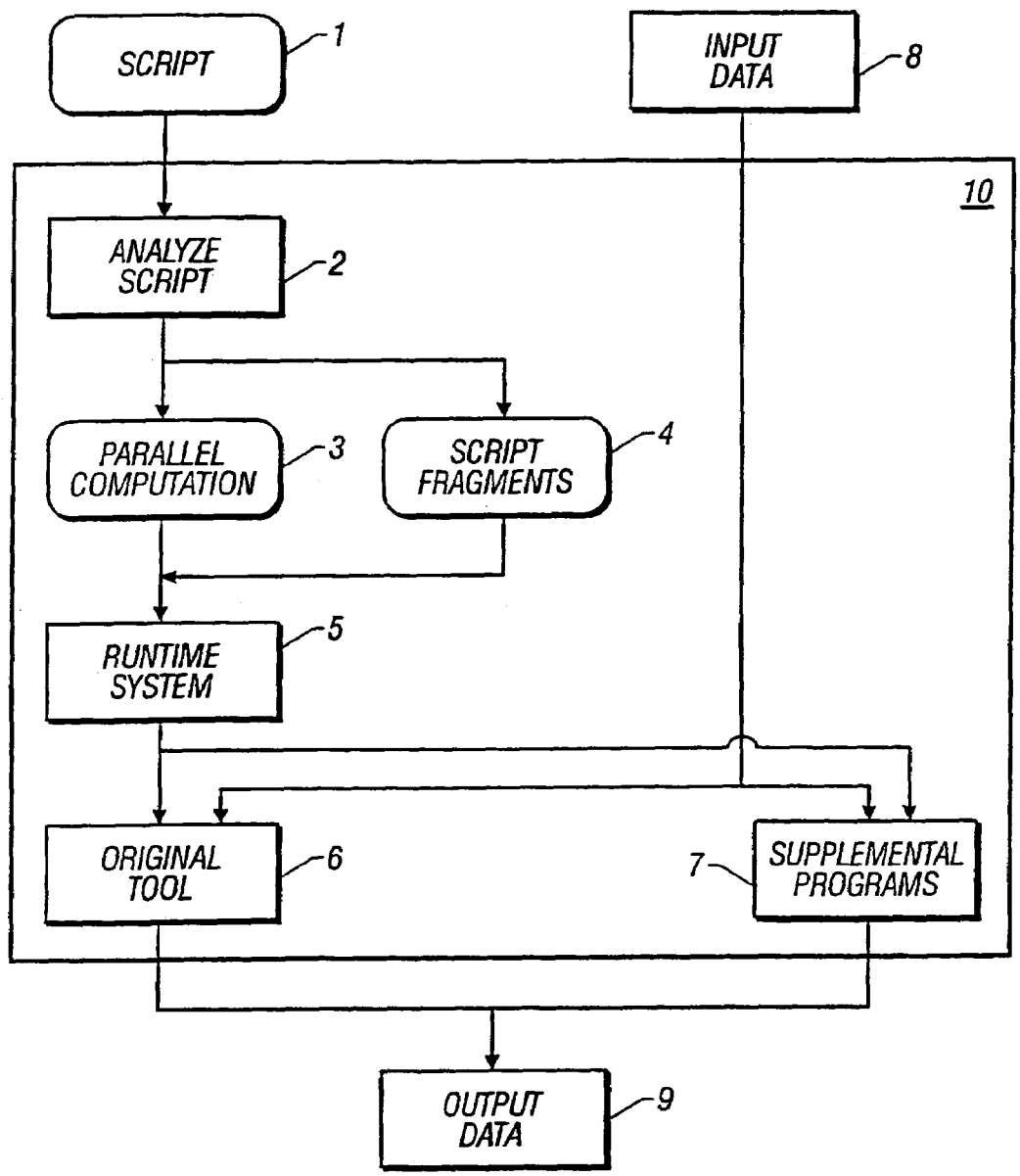
FIG. 1 is a data flow diagram of a preferred embodiment of the invention.

FIG. 1 is a data flow diagram of a preferred embodiment of the invention. A software tool script 1 in a language such as SAS is automatically analyzed 2 in order to produce a specification for a parallel computation 3 plus a set of "script fragments" 4. The combination of the parallel computation specification 3 plus the script fragments 4 is functionally equivalent to the original script 1. The parallel computation specification plus the script fragments are then executed by a parallel runtime system 5, which may be, for example, the Co>Operating System™ run time system from Ab Initio Software Corporation. Such execution causes multiple instances of the original software tool 6 and/or supplemental programs 7 to be run in parallel. The resulting processes 6, 7 will read input data 8 and produce output data 9, performing the same computation as was specified by the original script 1. The combination 10 of the analyzer, runtime system, tool, and supplemental programs will, for a given script 1 and input data 7, produce the same output data 8 as the original software tool 6 alone, but uses multiple processors in parallel to obtain substantial improvements in overall "throughput".

In order to apply the preferred embodiment, the software tool 6 and scripting language for each script 1 should satisfy certain conditions:

- The scripting language should consist of sequences of statements, such as processing steps and dataset definitions (e.g., files, databases, temporary datasets).
- The scripting language should specify, explicitly or implicitly, any data read/written by the processing steps. This may include temporary datasets used to pass information between processing steps; external datasets defined in dataset definition statements; and external datasets referenced (perhaps implicitly) within processing steps.
- Methods should be known (e.g., from conventional algorithms) to parallelize at least some of the processing steps. Parallelization methods include partitioning data into subsets and running an indicated processing step on each subset; inserting a separately available parallel implementation of the procedure; and dividing data into partitions and running a "global procedure" on each subset, then running a "local procedure" on the output of the global procedure (the global and local procedures may preferably—but need not necessarily—be implemented in the base scripting language).

Figure 2:
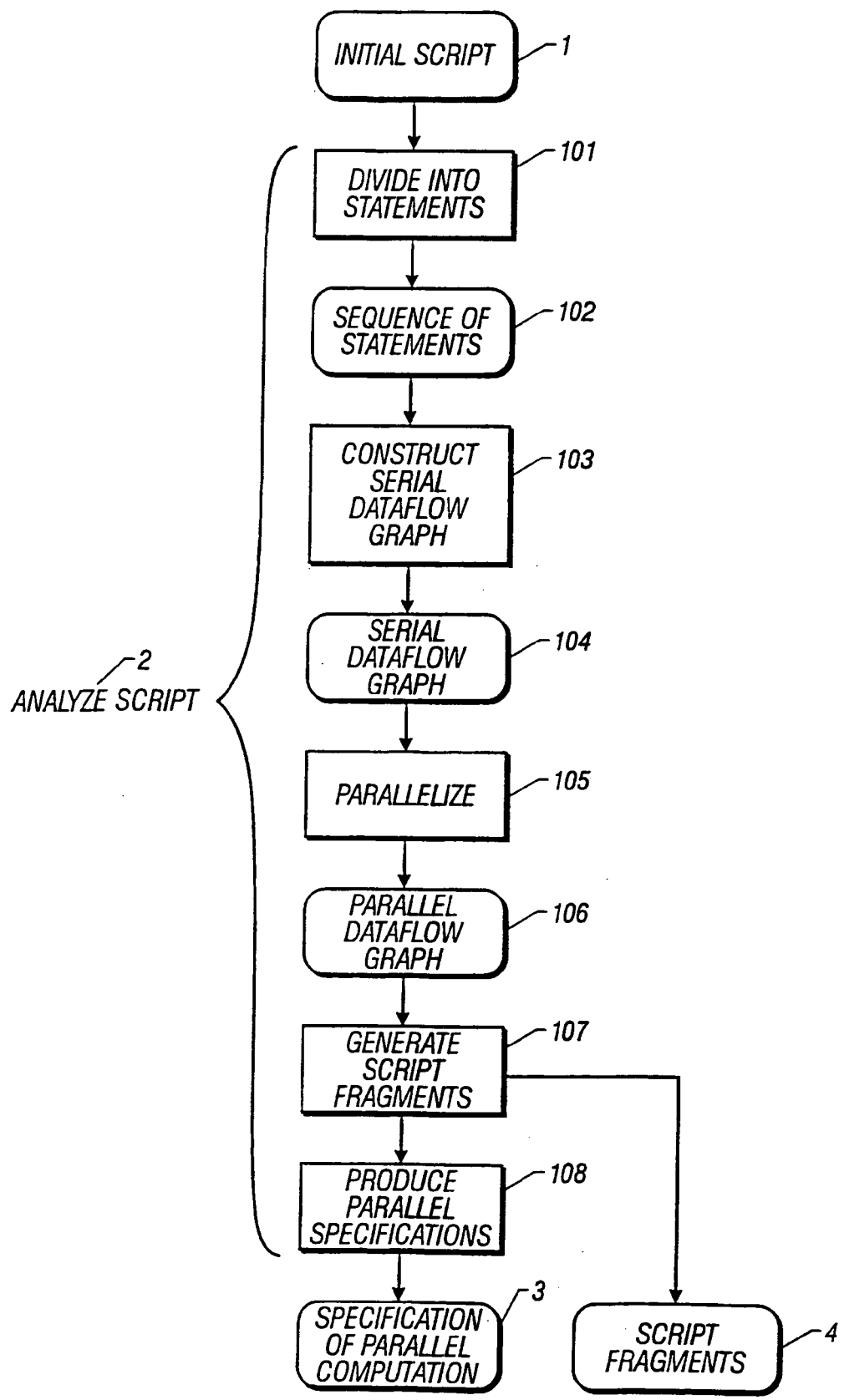
FIG. 2 is a data flow diagram showing the preferred method for automatically analyzing an initial script and producing a specification of a parallel computation plus script fragments.

FIG. 2 is a data flow diagram showing the preferred method for automatically analyzing 2 an initial script 1 and producing a specification of a parallel computation 3 plus script fragments 4. The script analysis method 2 may be implemented as follows:

Step 101: Divide the input script 1 into a sequence of statements 102.

Step 103: Process the sequence of statements 102 so as to produce a serial dataflow graph 104 representing the exchange of data between processing steps.

Step 105: Parallelize the serial dataflow graph 104, thereby producing a parallel dataflow graph 106.

Step 107: Optionally, analyze the parallel dataflow graph 106 to generate "script fragments" 4, to allow the original script-driven application to execute some of the processing steps.

Step 108: The resulting dataflow graph 106 may then be transcribed to a specification of a parallel computation 3.

At several points in the algorithm, the computation being performed is represented as "dataflow graphs". There are two cases: the serial dataflow graph 104, which represents the computation as performed, serially, by the original application; and the parallel dataflow graph 106, which represents the computation as performed, in parallel, by the combination of the parallel runtime system 5, the original software tool 6, and supplemental programs 7 (described further below). These dataflow graphs 104, 106 may be represented in various ways, but most often are represented either in graphical form (e.g., FIG. 3) or as tables representing the vertexes and edges of the graph (e.g., FIG. 6). Both notations may be used as convenience dictates.

Figure 3:
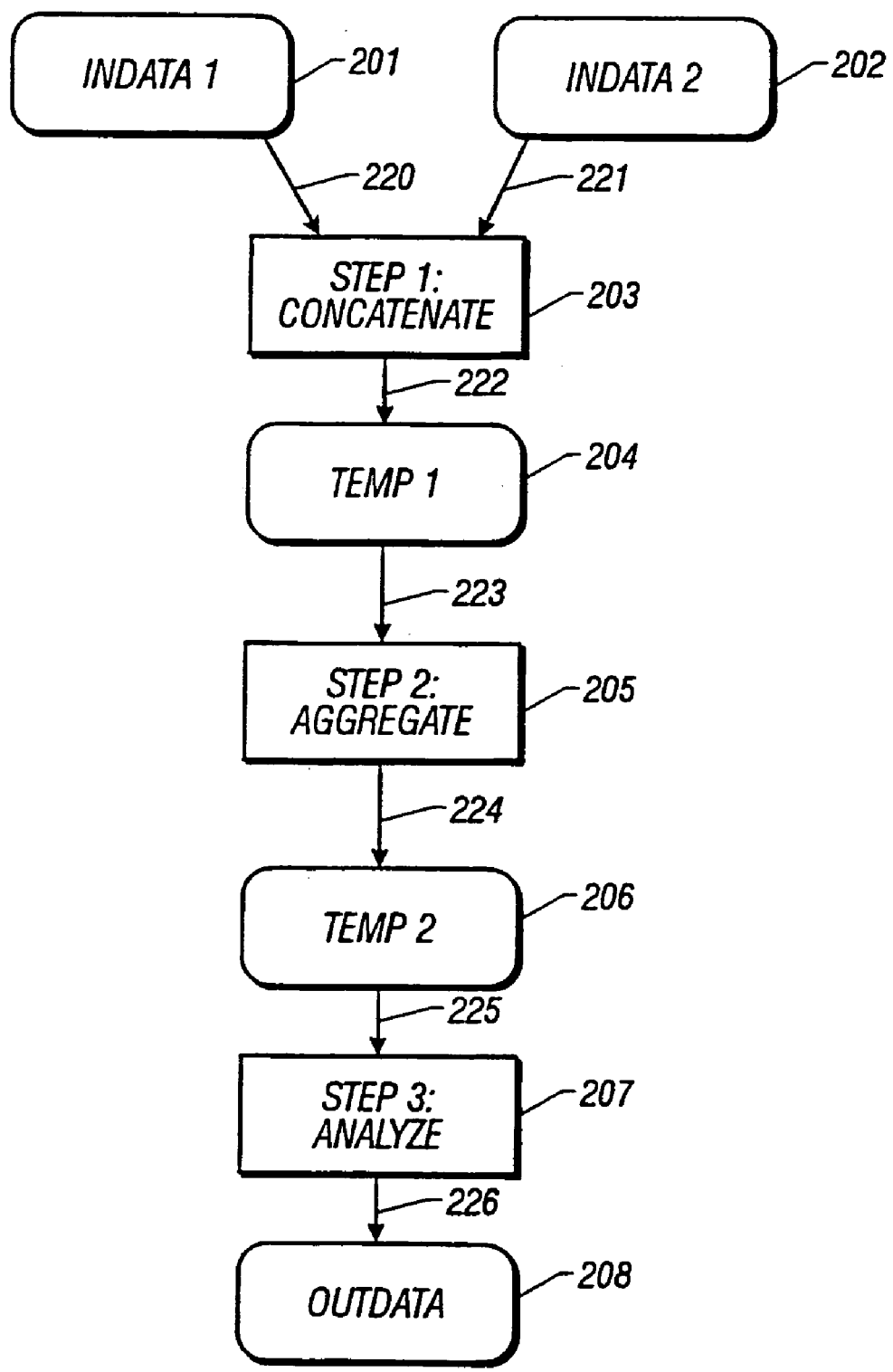
FIG. 3 is an example of a serial dataflow graph in graphical form.

FIG. 3 is an example of a serial dataflow graph 104 in graphical form. Such a graph typically has of a set of vertexes which represent, for example, the dataset(s) 201, 202 being read by the script; the dataset(s) 208 being written by the script; the processing Steps 203, 205, 207 contained in the script; and any intermediate results 204, 206 passed from one step to another, either explicitly or implicitly.

A typical serial dataflow graph 104 also has a set of directed edges 220–226 indicating the datasets accessed by each processing step. In the illustrated embodiment, edges directed into processing Steps 220, 221, 223, 225 indicate that a dataset/intermediate result is being read, while edges directed out of a processing Step 222, 224, 226 indicate that a dataset/intermediate result is being written by a processing step.

Figure 4:
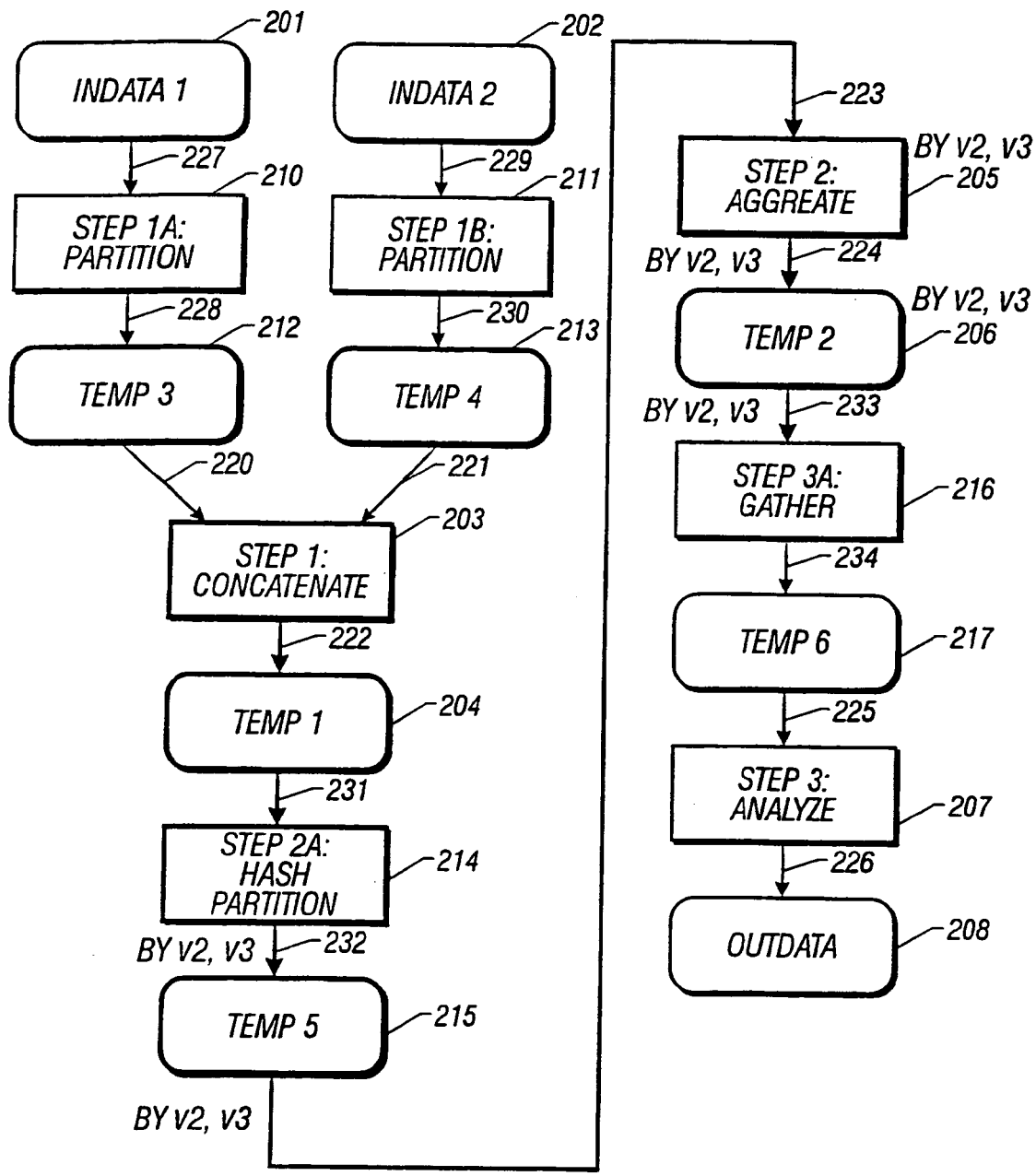
FIG. 4 is an example of a parallel dataflow graph in graphical form.

FIG. 4 is an example of a parallel dataflow graph 106 in graphical form. Typically, a parallel dataflow graph is identical to the corresponding serial dataflow graph except for the following:

Some of the original processing Steps 203, 205 have been marked for parallel execution (indicated by heavy line weight).

Some of the original intermediate results 204, 206 have been marked as being "partitioned" datasets (indicated by heavy line weight).

Some of the original dataset accesses 220, 221, 222, 223, 224 are marked as accessing parallel data (indicated by heavy line weight).

Some new intermediate results 212, 213, 215, 217, processing Steps 210, 211, 214, 216, and dataset accesses 227–234 have been added in order to partition data as required by various processing steps. Some of the new intermediate results 212, 213, 215 are marked as partitioned. Some of the new processing Steps 210, 211, 214 are marked for parallel execution. Some of the new dataset accesses 228, 230, 231, 232, 233 are marked as accessing parallel data.

Notations as to partitioning key (e.g., "By v2, v3") have been added to various processing Steps 205, datasets 215, 206, and dataset accesses 223, 224, 232, 233. These notations indicate the manner of data partitioning, as will be explained below.

While the invention has general applicability to parallelizing applications based on script-driven tools, the inventive method does require tailoring for each specific script-based tool, based on details of the facilities provided by the application and the semantics of the application's scripting language. The inventive method also requires some tailoring to the specific parallel runtime system being used. Given the methods contained herein plus the application-specific information just noted, such tailoring can be done by a programmer of ordinary skill. Details of how to address some specific issues which arise in parallelizing SAS applications are set forth below.

ILLUSTRATIVE EXAMPLE OF A SCRIPT-DRIVEN APPLICATION

In order to illustrate some of the problems addressed by the invention, a hypothetical data analysis program called analyze will be described, along with its scripting language. The purpose of this hypothetical program and scripting languages is to illustrate features of scripting languages which are common and conventional, and to provide a basis for various examples which will be used to illustrate methods of parallelizing applications of script-driven tools.

The hypothetical "analyze" program has the following basic capabilities:

Reading data from files or relational databases.

Writing data to files or relational databases.

Transforming one dataset to another by performing simple calculations on each record of a dataset.

Concatenating datasets.

Computing the aggregate functions "SUM", "MIN", and "MAX". These aggregate functions can be applied to the full dataset. Alternately, a "grouped aggregate" may be computed (as in the SQL "GROUP BY" or SAS "BY" and "CLASS" statements). This will be illustrated below.

Analyzing data by application of an analysis algorithm.

1. Invoking the Application

In this illustration, the application is invoked via a "command line" which specifies the name of the application ("analyze"), the name of a file containing a script, and zero or more command-line parameters. For example, the following command line would run the "analyze" application, using the script "script1" and specifying the command-line parameter "datafile1":

analyze script1 datafile1

Command-line parameters may be referenced from within the script, as necessary, by a construct of the form $<number>, such that $1 will refer to the first command-line parameter, $2 will refer to the second command-line parameter, and so forth. References to command line parameters may be used in place of filenames in dataset declarations.

2. Dataset Declarations

A dataset is a sequence of records. In the illustrated example, each record consists of a list of space-separated data fields, and the first record of a dataset contains the names of the data fields (for brevity sake, some examples will omit the list of field names). For example:

| custno | month | year | balance | limit |
|--------|-------|------|---------|-------|
| 00001  | 01    | 98   | 0400    | 1000  |
| 00001  | 02    | 98   | 0600    | 1000  |
| 00001  | 03    | 98   | 0200    | 1000  |
| 00002  | 01    | 98   | 0100    | 3000  |
| 00002  | 02    | 98   | 0000    | 3000  |

Datasets may be declared as follows:

INPUT datasetname filename

Declares a dataset to be read. The "filename" gives the name of the file containing the data. The "datasetname" may be used to refer to the dataset elsewhere in the script.

OUTPUT datasetname filename
  As above, but declares a dataset to be written by the application.

TEMP datasetname filename
  As above, but declares a temporary dataset to be used within the application.

DB_IN datasetname tablename
  Like the INPUT statement, but gets its data from a relational database table called tablename. The type of the data is determined by querying the database.

DB_OUT datasetname tablename
  Like the OUTPUT statement, but sends its data to a relational database table called tablename.

For example, if data to be processed is in a file, an input dataset might be declared as follows:
  INPUT customers customers.dat Alternatively, if the data was in a database table, an input dataset might be declared as follows:
  DB_IN customers cust_table A command line parameter might also be used to name a file for a dataset. For example:
  INPUT customers $1

3. Processing Steps

The hypothetical analyze application defines the following processing steps: copy, concatenate, aggregate, and analyze. Each of these processing steps produces a single output and, except for the concatenate step, each step gets its data from a single input.

By default, the output of one processing step will be used as the input of the next processing step. For example, in the following script step1's output will be used as step2's input:
  step1
  step2

If a data statement comes immediately before a processing step, then the processing step will get its input from the data statement. Similarly, if a data statement comes immediately after a processing step, then the processing step will write its data to the specified dataset. For example, in the following script step1 will read its input from the indata dataset and write its output to the outdata dataset:
  INPUT indata input.data
  step1
  OUTPUT outdata output.data These rules may be overridden by adding a clause of the form OUTPUT=dataset or INPUT=dataset to any processing step. For example, in the following script step1 will get its data from indata and write to outdata:
  INPUT indata input.data
  OUTPUT outdata output.data
  step1 INPUT=indata OUTPUT=outdata 4. The Copy Statement The copy statement has the following syntax:
  COPY field=expression, field=expression . . .

The copy statement copies one dataset to another. Each record in the output dataset is constructed by evaluating the indicated expressions, with variables in the expressions standing for fields in the input record. For example, suppose the following dataset is to be processed:

| v1 | v2 | v3 |
|----|----|----|
| 1  | 2  | 3  |
| 2  | 4, | 2  |

Here is a sample script:
  INPUT indata input.data
  COPY v1=v1, v2=v2, v3=v3, v4=v1+v2+v3
  OUTPUT outdata output.data
The following output would be produced:

| v1 | v2 | v3 | v4 |
|----|----|----|----|
| 1  | 2  | 3  | 6  |
| 2  | 4  | 2  | 8  |

5. The Concatenate Statement

The concatenate statement has the following syntax:
  CONCATENATE dataset1 dataset2 . . .

The output of this statement is the result of reading each of the specified datasets and writing all their records to a single output dataset. The order of the output data does not matter. However, the list of fields in the datasets must match. In the illustrated embodiment, the CONCATENATE operation does not obey the default input rules used by other processing statements (i.e., it does not take, as input, the output of the previous statement).

6. The Aggregate Statement

The aggregate statement is used to compute the following aggregates over sets of records: SUM, MIN (minimum), MAX (maximum). The aggregate statement has the following syntax:
  AGGREGATE field=aggop expression, field=aggop expression . . . [BY key, key . . . ]

An "aggregation operation" (aggop) consists of one of the keywords SUM, MIN, MAX. If no BY clause is specified, then the output of the AGGREGATE operation is a single record containing the sums/minima/maxima (as appropriate) of the indicated expressions, computed across the entire dataset. For example, suppose the following dataset is to be processed:
  value
  1
  2
  3
  4

Here is a sample script:
  INPUT indata input.data
  AGGREGATE v1=MIN value, v2=MAX value, v3=SUM value
  OUTPUT outdata output.data
This produces the following output:

| v1 | v2 | v3 |
|----|----|----|
| 1  | 4  | 10 |

If the BY clause is specified, then the data will be divided into subsets, with each subset having identical values for all the keys specified in the BY clause. The aggregates will be computed for each such subset. The keys in the BY clause will be put at the front of each output record. For example, suppose the following dataset is to be processed:

| k1 | k2 | value |
|----|----|-------|
| 1  | 2  | 7     |
| 3  | 4  | 1     |
| 3  | 4  | 2     |
| 3  | 4  | 3     |

Here is a sample script:
INPUT indata input.data
AGGREGATE v1=MIN value, v2=MAX value, v3=SUM value BY k1, k2
OUTPUT outdata output.data
This produces the following output:

| k1 | k2 | v1 | v2 | v3 |
|----|----|----|----|----|
| 1  | 2  | 7  | 7  | 7  |
| 3  | 4  | 1  | 3  | 6  |

7. The Analyze Statement

The analyze statement is used to invoke an algorithm which computes a single integer value based on a set of records. As with aggregate, the analyze statement takes an optional BY clause. The analyze statement is included to illustrate the measures which may be taken in cases where one or more statements cannot be parallelized.

ANALYZE [BY key, key . . . ];

ILLUSTRATIVE EXAMPLE OF A PARALLEL RUNTIME SYSTEM

In order to run the example application in parallel, it is necessary to employ a "parallel runtime system." This is a software system which allows programs to be simultaneously run on multiple processors. While the methods described in this disclosure are not specific to any particular parallel runtime system, a simple runtime system will be described for purposes of illustration. The sample runtime system has four statements: run, simple-partition, hash-partition, and gather. The sample runtime system uses data in the same format as used by the analyze system.

1. The Run Statement

The run statement has the form:

run count program argument1 argument2

The run statement invokes count instances of the specified program, passing the specified arguments on the command line to the program instances. For example, the statement run 3 myprogram arg1 would run three instances of myprogram in parallel, providing each instance with the command line parameter arg1.

Any of the arguments may optionally consist of a list of count semicolon-separated elements. For example, the argument a; b; c would be interpreted as a list of three elements, a, b, and c. When the program is run, the $n^{th}$ invocation of each program will be called with the $n^{th}$ element of each such list. For example, the statement run 2 myprogram a1; a2 b1; b2 will run two instances of myprogram in parallel. The first instance will be given the arguments a1 b1, and the second will be given the arguments a2 b2.

2. The Simple-Partition Statement

The simple-partition statement has the form:

simple-partition input output

The simple-partition statement takes records from a semicolon-separated list of input files and divides them up among a semicolon-separated list of output files. The division may be done in any matter which divides the data up more-or-less equally. For example, in round-robin partitioning, the $k^{th}$ input record from each input file is written to output file (k mod m), where m is the number of output files. This operation is done in parallel. For example, suppose the following two input files "in1" and "in2" are to be processed:

| v1 |
|----|
| in1: |
| 0 |
| 1 |
| 2 |
| in2: |
| 3 |
| 4 |
| 5 |

Using the statement simple-partition in1; in2 out1; out2; out3, may result in the following three output files:

| v1 |
|----|
| out1: |
| 0 |
| 3 |
| out2: |
| 1 |
| 4 |
| out3: |
| 2 |
| 5 |

3. The Hash-Partition Statement

The hash-partition statement has the form:

hash-partition key input output

The hash partition statement reads records from a semicolon-separated list of input files and divides them up among a semicolon-separated list of output files. The statement requires a semicolon-separated list of key fields to be specified. For each input record, the hash partition operation will compute a "hash function" based on the specified key-values and use this function to determine the output file to which the record will be written. For example, the hash function could be computed as (k mod m)+1, where k is the sum of the values of the key fields and m is the number of output files. When this is done, all records having a given key-value will end up in the same output file. This operation is done in parallel. For example, suppose, suppose two input files "in1" and "in2" are to be processed

|     v1   |    v2   |
| --- | --- |
| in1:     |         |
| 0        | 0       |
| 0        | 1       |
| 2        | 2       |
| in2:     |         |
| 0        | 3       |
| 1        | 4       |
| 2        | 5       |

Using the statement hash-partition v1 in1; in2 out1; out2; out3 results in the following three output files:

|     v1   |    v2   |
| --- | --- |
| out1:    |         |
| 0        | 0       |
| 0        | 1       |
| 0        | 3       |
| out2:    |         |
| 1        | 4       |
| out3:    |         |
| 2        | 2       |
| 2        | 5       |

4. The Gather Statement

The gather statement has the form:

gather input output

The input is a semicolon-separated list of files, and the output is a single file. The records in the input file are combined into a single output file. This operation is done in parallel.

PREFERRED EMBODIMENT OF THE INVENTION

The following subsections describe the preferred embodiment of the "analyze script" 2 steps set forth in FIG. 2

1. Step 101—Dividing into Statements

Referring again to FIG. 1 and FIG. 2, Step 101 divides the original script 1 into a sequence of statements 102. This is primarily a matter of parsing the original script and producing a "parse tree." Methods for parsing computer languages are extremely well known; in most cases, all that is required is to write a "grammar" and process that grammar with a "parser generator" such as "yacc". The result will be a program to perform the parsing.

Figure 5:
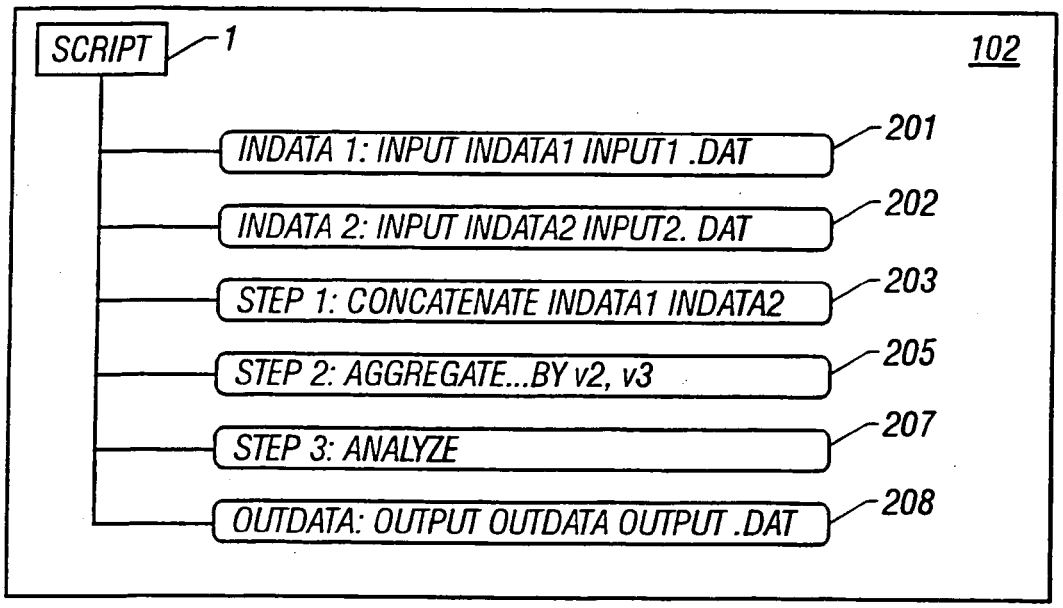
FIG. 5 shows an example of an initial script and a representation of the sequence of statements it contains.

FIG. 5 shows an example of an initial script 1 and a representation of the sequence of statements 102 it contains. These statements are categorized as datasets 201, 202, 208 and processing Steps 203, 205, 207. For convenience sake, textual identifiers (e.g., "Step1") have been added to the statements.

2. Step 103—Constructing a Serial Dataflow Graph

Step 103 is the construction of a serial dataflow graph 104. This is done by analyzing the sequence of statements 102. The goal is to produce a set of nodes representing datasets, processing steps, and intermediate results, and to produce a set of edges indicating the datasets/temporary results which are read or written in each processing step.

In this illustration, the serial dataflow graph 104 will be represented by three tables: a dataset table 601, a processing step table 602, and a dataset access table 603 (representing dataset access by the processing steps). FIG. 6 is a diagram showing examples of dataset table, processing step, and dataset access tables.

In the illustrated embodiment, each entry in the dataset table 601 consists of:

A name for each dataset.

The class of the dataset (e.g., input, output, temporary).

An indication as to the location of the data (e.g., a filename).

An indication of whether the dataset was explicitly present in the original script.

Any other information present in the original script.

In the illustrated embodiment, each entry in the processing step table 602 consists of:

A name for each processing step.

The operation being performed.

Any parameters or other information supplied in the script (e.g., aggregate expressions, any BY clauses).

In the illustrated embodiment, each entry in the dataset access table 603 consists of:

The name of a processing step.

The name of a dataset which is accessed by that processing step.

The direction of the access (e.g., input vs. output).

An indication as to the role of the dataset. For example, a processing step might read two inputs "old" and "new" and write two outputs "output" and "errors." Most processing steps will read from a single input (e.g., "in") and write to a single output (e.g., "out").

Figure 7:
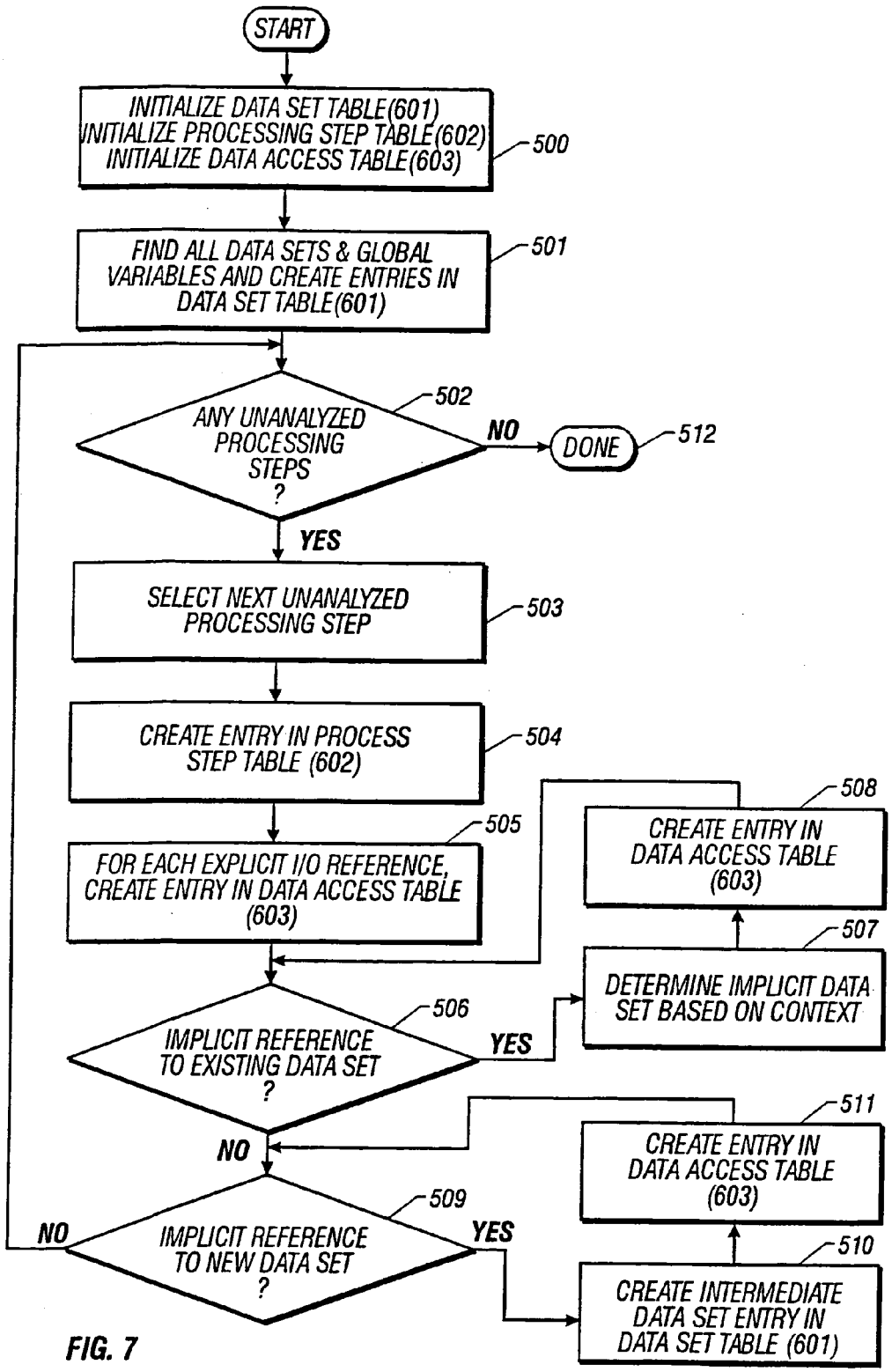
FIG. 7 is a flowchart showing an example of converting a sequence of steps into a serial dataflow graph.

FIG. 7 is a flowchart showing an example of converting a sequence of steps into a serial dataflow graph. In the preferred embodiment, this method includes the following steps.

Step 500: Create initially empty tables for datasets 601, processing steps 602, and dataset accesses 603 (see FIG. 6 also).

Step 501: Scan the statements 102 and create an entry in the dataset table 601 for each dataset 201, 202, 208 and global variable identified in the statements 102. Each entry is constructed by extracting the name of the global variable or dataset (plus additional dataset-specific information from the dataset statement) and noting that the dataset or global variable was explicitly present in the original script.

Step 502: Determine whether any processing Steps 203, 205, 207 have not yet been analyzed and added to the processing step table 602. If all processing steps have been analyzed, the analysis is done (Step 512).

Step 503: Select the next unanalyzed processing step.

Step 504: Create an entry in the processing step table 602 for each such processing step. This entry should contain a name for the processing step. These names may be automatically generated, e.g., by generating a sequence of "step numbers." Each entry should also include any parameters extracted from the processing step statement.

Step 505: Determine which datasets 201, 202, 208 are explicitly referenced by the current processing step, and create one entry in the dataset access table 603 for each such reference.

Step 506: Determine whether the current processing step implicitly references an existing dataset. If so, loop as follows until each reference to an implicit input is processed:

Step 507: Examine the context of the processing step to determine which dataset is implicitly referenced.

Step 508: Create an entry in the dataset access table 603, with the "processing step" being the current processing step and the "dataset" being the implicitly referenced dataset. In almost all cases, this form of implicit reference will be to an "implicit input".

Step 509: Determine whether the current processing step implicitly creates a new dataset. If so, loop as follows until each reference to a new dataset is processed:

Step 510: Create an entry in the dataset table 601 for a new implicit dataset. This involves creating a new dataset identifier and noting that the dataset was not explicitly created.

Step 511: Create an entry in the dataset access table 603, with the "processing step" being the current processing step, and the "dataset" being the newly created intermediate result dataset. In almost all cases, this form of implicit reference will be to an "implicit output".

The exact method for resolution of implicit dataset references (Steps 507 and 510) is dependent on the semantics of the scripting language being processed. However, the rules for this resolution are typically quite simple, and the implementation of such resolution strategies should be a matter of routine programming. The rules used for implicit dataset resolution in the analyze scripting language described above are representative of one way to perform this task:

If a processing step requires input data, and no input dataset is specified, and the previous statement is a dataset, then the previous statement's dataset is implicitly referenced as the current processing step's input.

If a processing step requires input data, and no input dataset is specified, and the previous statement is a processing step, then the output of the previous processing step is implicitly referenced as the current processing step's input.

If a processing step produces output, and no output dataset is specified, and the next statement is a dataset, then the next statement's dataset is implicitly referenced as the current processing step's output.

If a processing step produces output, and no output is specified, and the next statement is a processing step, then a new intermediate dataset is implicitly created and implicitly referenced as the current processing step's output.

As an example of resolution of implicit references, see FIG. 6. The sample script 1 shown in FIG. 6 contains three processing Steps 203, 205, 207, shown in the processing step table 602. For this example, the explicit and implicit dataset references are as follows:

The first processing step 203 is the "CONCATENATE" operation, which explicitly reads from the datasets indata1 201 and indata2 202. No output dataset is specified, so the processing step implicitly creates and references an intermediate result "temp1" 204 in the dataset table 601.

The second processing step 205 is the "AGGREGATE" operation. No input is specified, so the operation implicitly references the output "temp1" 204 of the previous step 203 as its input. No output is specified, so the processing step implicitly creates and references an intermediate result "temp2" 206 in the dataset table 601.

The final processing step 207 is the "ANALYZE" operation. No input is specified, so the operation implicitly references the output "temp2" 206 of the previous step 205 as its input. No output is specified, but the next operation is the output dataset "outdata" 208, so "outdata" is implicitly referenced.

3. Step 105—Parallelizing the Serial Dataflow Graph a. Overview

This section will describe how, given a repertoire of methods for parallelizing some of the individual steps of the application, it is possible to automatically generate a parallel dataflow graph 106 from the serial dataflow graph 104. For this method to work, the parallelization repertoire should be encapsulated as a database, program, or algorithm which may examine a single vertex in the serial dataflow graph 104 and generate one or more vertexes and edges in the parallel dataflow graph 106. Given a suitable repertoire of parallelization methods plus representations for the serial and parallel dataflow graphs, construction of such a repertoire application method should be a matter of routine programming.

Figure 8:
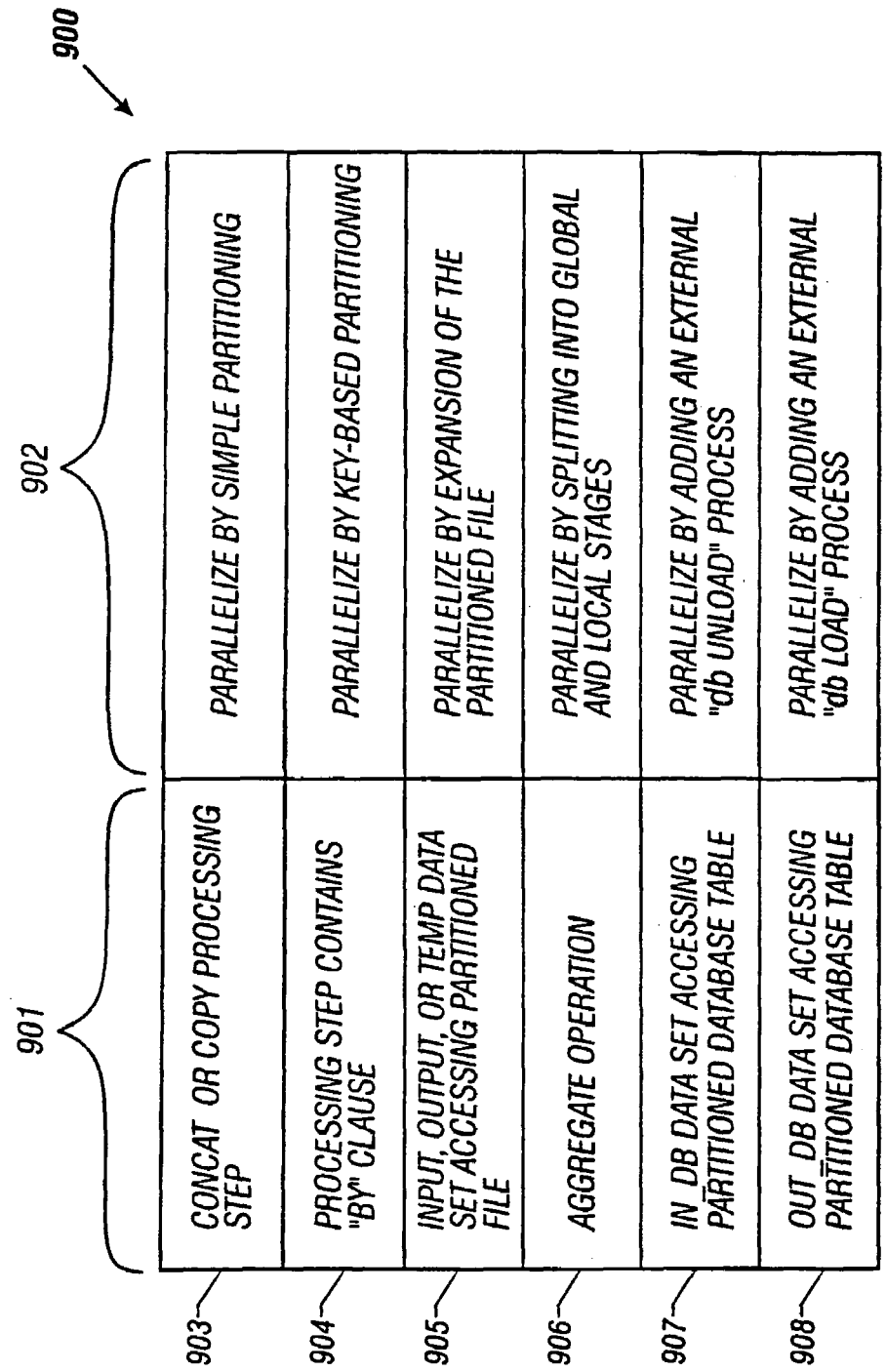
FIG. 8 is a table showing a repertoire of parallelization methods.

FIG. 8 is a table 900 showing a repertoire of parallelization methods. In general, each parallelization method will have an applicability test 901, a rewrite rule 902, and some notion of optimality (e.g., represented by the order in which the parallelization methods are considered). FIG. 8 is described in further detail below.

Many methods are known for parallelizing computations which might be included in the repertoire. The present invention primarily (though not exclusively) utilized one particular family of techniques which involve:

Dividing the input data into multiple disjoint subsets. This is called "partitioning." Each such subset is called a "partition." Many forms of partitioning are known, differing in the manner in which the data is divided into subsets.

Running multiple instances of a program, arranging for each instance to process a different partition of the data. This is called "partitioned execution."

If the input data can be suitably partitioned, then partitioned execution will generally lead to large improvements in performance. For example, if data were partitioned 30 ways, then each instance of the processing step would process 1/30 the data, and should thus complete its work in 1/30 the time which would be required under serial execution. For further discussion of partitioning, see U.S. Pat. No. 5,819,021, issued Oct. 6, 1998, entitled OVERPARTITIONING SYSTEM AND METHOD FOR INCREASING CHECKPOINTS IN COMPONENT-BASED PARALLEL APPLICATIONS, and assigned to the assignee of the present invention. The teachings and contents of U.S. Pat. No. 5,819,021 are hereby incorporated by reference.

Figure 9:
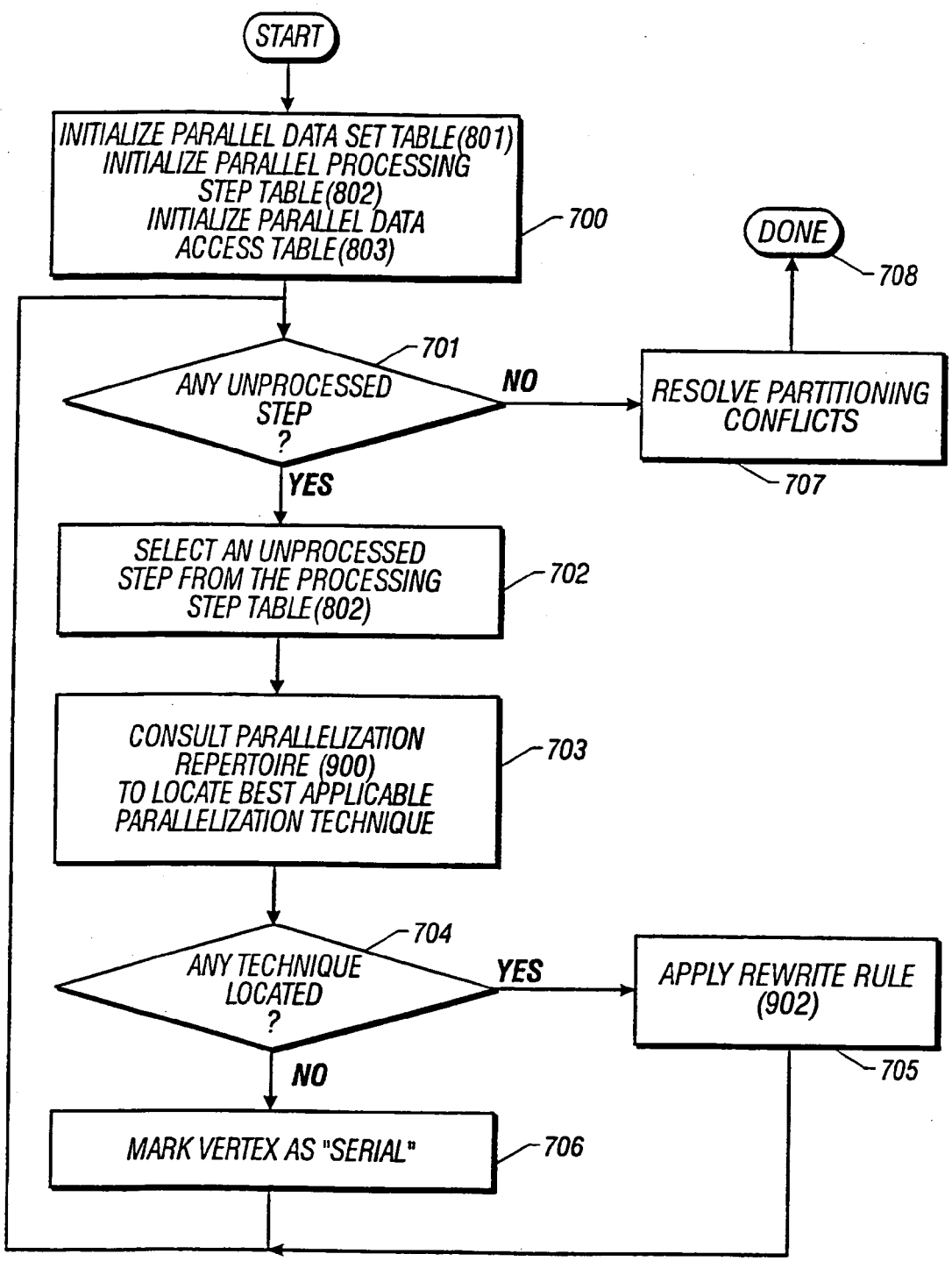
FIG. 9 is a flowchart showing the preferred method for parallelizing a serial dataflow graph.

FIG. 9 is a flowchart showing the preferred method for parallelizing a serial dataflow graph 104. The method takes, as its input, a serial dataflow graph 104, preferably represented as dataset 601, processing step 602, and data access tables 603. The method produces, as its output, a parallel dataflow graph 106, preferably represented as a parallel dataset table 801, a parallel processing step table 802, and a parallel data access table 803. FIG. 10 is a diagram showing examples of initial parallel dataset, processing step, and data access tables. The method includes the following steps:

Step 700: Initialize the parallel dataset 801, processing step 802, and data access 803 tables. This is done by copying the information contained in the serial dataset 601, processing step 602, and data access 803 tables, and initializing a "partitioning" data element. For datasets stored in normal (serial) files 201, 202, 208, the partitioning data element will be initialized to "serial", signifying that these files are not parallel. Otherwise, the partitioning data element will be left blank, signifying that the manner of parallelization has not yet been determined.

Step 701: The system will repeatedly look for processing steps which have not yet been processed. This may be done by scanning the processing step table 802 for steps having blank "partitioning" data elements.

Step 707: If all steps have been parallelized, then a "partitioning conflict resolution algorithm" is invoked to ensure that data is correctly partitioned. This algorithm is discussed below. Once this has been done, parallelization is complete (Step 708).

Step 702: If the graph contains unprocessed steps, then one step is selected (e.g., arbitrarily).

Step 703: The parallelization repertoire table 900 will then be consulted to locate a parallelization method which is applicable to the step just selected.

Step 705: If a parallelization method was located, then its rewrite rule 902 is applied to modify the information in the parallel dataset 801, processing step 802, and data access tables 803. Once this is done, the algorithm looks for another unprocessed element (at Step 701).

Step 706: If no parallelization method was located, then the step's "partitioning" method is set to "serial", indicating that the step must be run serially. Once this is done, the algorithm looks for another unprocessed element (at Step 701).

b. Example

The method just described may be applied to a serial dataflow graph in the following manner. As noted above, FIG. 10 is an example of initial parallel dataset, processing step, and dataset access tables. FIG. 11 is a diagram showing the parallel dataset, processing step, and dataset access tables of FIG. 10 after parallelization but before resolution of conflicts (see also FIGS. 6, 8, and 9).

Step 700: Initialization.
　The parallel dataset table 801 is initialized.
　　The input 201, 202 and output 208 datasets are marked as "serial."
　　All other information is simply copied from serial dataset table 601.
　The contents of the serial processing step table 602 are copied to produce the parallel processing step table 802.
　The contents of the serial dataset access table 603 are copied to produce the parallel dataset access table 803.

Step 701: An unprocessed step 203 (Application Step 1 in the parallel processing step table 802) is selected.

Step 703: By reference to the parallelization repertoire table 900, it is determined that the CONCATENATE ("CONCAT") operation 903 may be parallelized by "simple partitioning".

Step 705: The rewrite rule for simple partitioning performs the following actions (see FIG. 11):
　The processing step 203 is marked for "simple" partitioning.
　The step's inputs 220, 221 and output 222 are marked as accessing simply partitioned data.

Step 701: Looping back, an unprocessed next step 205 (Application Step 2 in the parallel processing step table 802) is selected.

Step 703: By reference to the parallelization repertoire table 900, it is determined that the "AGGREGATE BY" operation 906 may be parallelized by "key-based partitioning".

Step 705: The rewrite rule for key-based partitioning performs the following actions (see FIG. 11):
　The processing step 205 is marked as partitioned "by v2, v3".
　The step's input 223 and output 224 are marked as partitioned "by v2, v3".

Step 701: Looping back, an unprocessed step 207 (Application Step 3 in the parallel processing step table 802) is selected.

Step 703: By reference to the parallelization repertoire table 900, it is determined that no parallelization method has been indicated.

Step 706: Accordingly, the processing step is marked for serial execution (see FIG. 11):
　The partitioning method for the processing step 207 is set to "serial".
　The step's input 225 and output 226 have their partitioning method marked as "serial".

Step 701: Looping back, no more unprocessed steps are located.

Step 707: Partitioning conflicts are resolved (see discussion immediately below). The result of this process is shown as FIG. 11.

c. Resolution of Partitioning Conflicts

Once all processing steps have been either parallelized or marked as serial, partitioning conflicts can be resolved (Step 707 in FIG. 9). In the illustrated embodiment, at the start of this algorithm, all processing steps will be labeled with a partitioning method, such as "serial", "simple", or "by key". Similarly, all external datasets will be labeled with a partitioning method. Dataset accesses will also be marked with a partitioning method. At this point, the graph may contain "partitioning conflicts". For example, there will often be mismatches between dataset access entries and the datasets they access. For example, Application Step 1 in FIG. 11 has two inputs 220, 221 which are marked for "simple" parallel partitioning, but the datasets 201, 202 they access are marked as "serial". As another example, temporary datasets may not yet have their partitioning method filled in.

Figure 12:
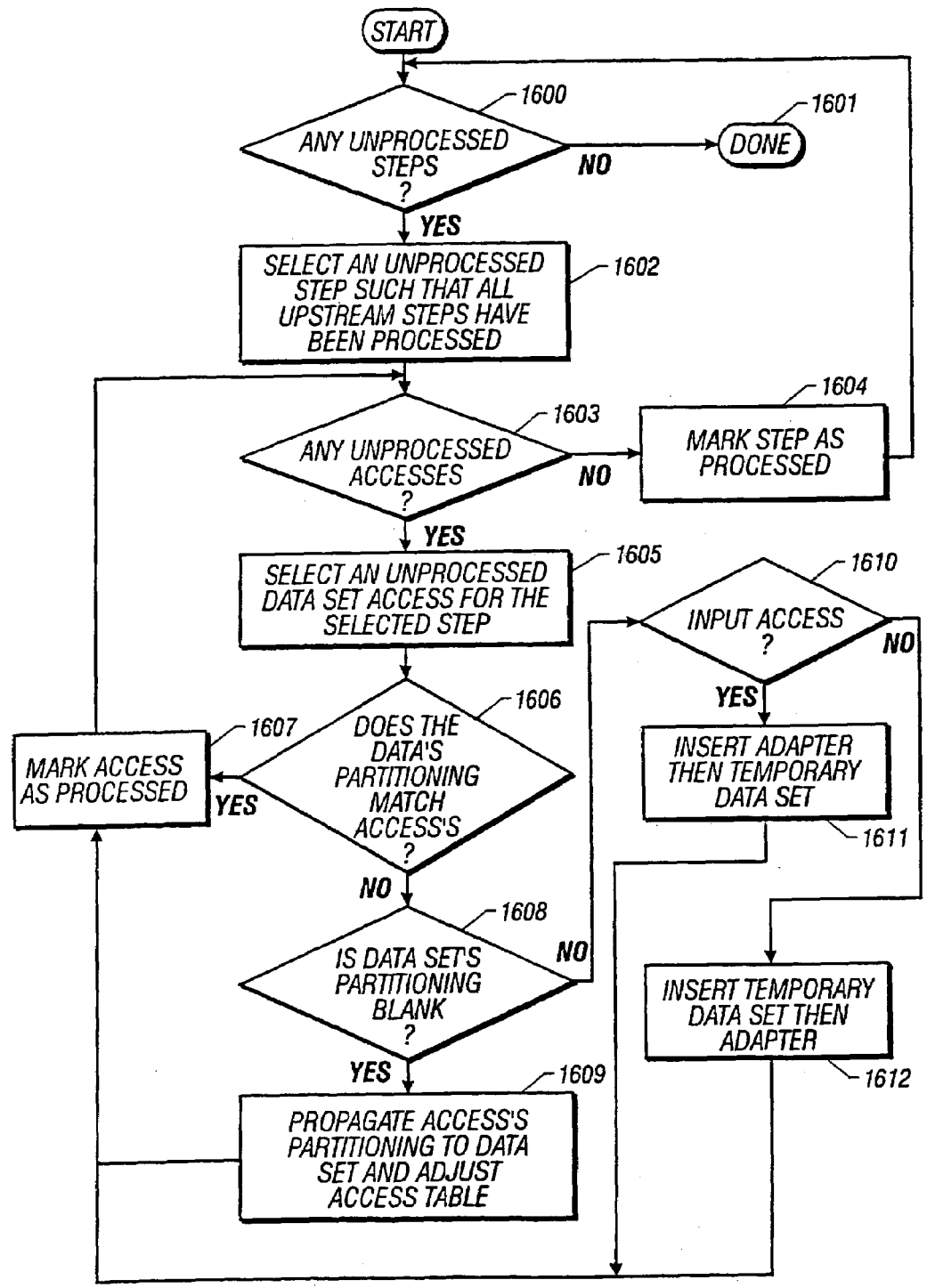
FIG. 12 is a flowchart showing a preferred method for resolving partitioning conflicts.

FIG. 12 is a flowchart showing a preferred method for resolving partitioning conflicts (Step 707 in FIG. 9):

Step 1600: Determine whether there are any unprocessed steps in the graph. If not, then algorithm is done (Step 1601).

Step 1602: Select a processing step such that all upstream steps have been processed.

Step 1603: Determine whether the processing step has any dataset accesses which are unprocessed. If there are no such accesses, then the step is marked as processed (Step 1604) and the algorithm looks for the next step to process (at Step 1600).

Step 1605: Select an unprocessed dataset access associated with the current processing step.

Step 1606: Determine whether the dataset access's partitioning method matches the dataset's partitioning method. In the preferred embodiment, the following rules apply:
　If the dataset's partitioning method is blank, then there is a mismatch.
　If the dataset's partitioning method is serial, and the access's method is not serial, then there is a mismatch.
　If the dataset's partitioning method is "simple" or "by-key", and the access's method is "serial", then there is a mismatch.

If the dataset's partitioning method is "simple", and the access's method is "by-key", then there is a mismatch.

If the dataset's partitioning method is "by-key", and the access's method is "by-key", but the keys differ, then there is a mismatch.

Otherwise the partitioning methods match, the access may be marked as processed (Step 1607) and the algorithm looks for another unprocessed dataset access (at Step 1603).

Step 1608: If the dataset's partitioning method is blank (this happens when accessing a temporary dataset), then the dataset's partitioning method is set to be the same as the dataset access's partitioning (Step 1609), after which the access is marked as processed (Step 1607) and the algorithm looks for another unprocessed dataset access (at Step 1603).

If the dataset's partitioning method is not blank, then it is necessary to insert one or more additional processing steps (called "adapters") to repair the partitioning conflict. An adapter may read one dataset and produce a second dataset having some desired partitioning. Further discussion of adapters is set forth in U.S. patent application Ser. No. 08/678,411, filed Jul. 2, 1996, entitled EXECUTING COMPUTATIONS EXPRESSED AS GRAPHS, and assigned to the assignee of the present invention. The teachings and contents of U.S. patent application Ser. No. 08/678,411 are hereby incorporated by reference.

The adapter which is selected depends on the partitioning required by the output dataset:

The simple-partition adapter produces a parallel dataset. Its input is a serial dataset, and its output is a simply partitioned dataset.

The gather adapter produces a serial dataset. Its input is a partitioned dataset and its output is a serial dataset.

The hash-partition adapter produces a dataset partitioned by some set of keys. The desired keys are passed as parameters to the hash-partition operation. Its input is any dataset (serial, simply partitioned, or key-partitioned), and its output is a dataset partitioned on the specified key.

The order in which an adapter is inserted depends on the type of data access. Accordingly, the method continues as follows:

Step 1610: Determine whether the dataset access represents an input (vs. an output) of the processing step being processed.

Step 1611: If the reference is to an input, then an adapter followed by a temporary dataset is inserted between the source dataset and the processing step. The partitioning of the adapter will match that of the source dataset, while the partitioning of the temporary dataset will match that of the dataset access.

Step 1612: If the reference is to an output, then a temporary dataset followed by an adapter will be inserted between the processing step and the destination dataset. The partitioning of the adapter will match that of the source dataset, while the partitioning of the temporary dataset will match that of the dataset access.

Once the adapter and temporary dataset have been inserted, the access will be marked as "processed" (Step 1607) and the algorithm will look for another unprocessed dataset access (at Step 1603).

d. Example

As noted above, FIG. 11 shows the parallel dataset, processing step, and dataset access tables of FIG. 10 after parallelization but before resolution of conflicts. FIG. 13 is a diagram showing FIG. 11 after resolution of Application Step 1 of the parallel processing step table. FIG. 14 is a diagram showing FIG. 13 after resolution of Application Step 2 of the parallel processing step table. FIG. 15 is a diagram showing FIG. 14 after resolution of Application Step 3 of the parallel processing step table. Application of the method shown in FIG. 12 results in the following process steps:

Steps 1600, 1602: The algorithm determines that Application Step 1 (processing step 203) has not been processed (see FIG. 11).

Steps 1603, 1604: The algorithm determines that the first input 220 of Application Step 1 has not yet been processed.

Step 1606: The dataset 201 is marked "serial", and the access 220 is marked "simple," so there is a conflict.

Step 1608: The partitioning of the dataset 201 is non-blank.

Step 1610: The dataset access reference 220 references an input.

Step 1611: An adapter and a temporary dataset are inserted between the input and the processing step.

A simple-partition adapter Application Step 1*a* 210 is created (see FIG. 13). As noted above, a partitioner produces a simply partitioned dataset, which matches the partitioning required by the dataset access reference 220 being processed.

The partitioner's partitioning is set to "serial", to match the input 201.

A temporary dataset "temp3" 212 is created. The temporary dataset's partitioning is set to "parallel", to match the dataset access reference 220.

New dataset access references 227, 228 are created to link the input 201, the adapter 210, and the temporary dataset 212. The "partitioning" attributes of the new dataset access references 227, 228 are set to match the datasets they reference (serial and simple, respectively).

The existing dataset access reference 220 is re-targeted to refer to the temporary dataset "temp3" 212.

Step 1607: The dataset access reference 220 is marked as processed.

Steps 1603, 1604, 1606, 1608, 1610, 1611; 1607: The same series of operations is repeated for the second input dataset referenced by Step 1, namely indata2. This results in the creation of a new partition adapter Application Step 1*b* 211, temporary dataset "temp4" 213, and dataset access references 229, 230.

Steps 1603, 1604, 1606: The algorithm processes the output dataset reference 222 of Application Step 1 (processing step 203).

Step 1608: The partitioning of the dataset being accessed, "temp1" 204, is blank.

Step 1609: The partitioning of dataset "temp1" 204 is set to "parallel", matching the partitioning of the dataset access reference 222.

Step 1607: The dataset access reference 222 is marked as "processed".

Step 1603: The algorithm determines that Application Step 1 (processing step 203) has no more unprocessed accesses.

Step 1604: The algorithm marks Application Step 1 (processing step 203) as "processed".

The state of the graph at this time is show in FIG. 13. The algorithm continues as follows:

Step 1600, 1602: The algorithm next selects Application Step 2 (processing step 205) for processing.

Step 1603, 1605, 1606, 1608, 1610: The algorithm selects Application Step 2's input 223 for processing and determines that it needs to insert an adapter and temporary dataset between the temporary dataset "temp1" 204 and the processing step 205.

Step 1611: The adapter is inserted, as above (See FIG. 14). This time, a "hash-partition" adapter is chosen, because the dataset access 223 specifies partitioning "by v2, v3". This results in the creation of an adapter Application Step 2a 214, a temporary dataset "temp5" 215, and two dataset references 231, 232.

Steps 1607, 1603, 1605, 1606, 1608: The algorithm selects Application Step 2's output 224 for processing, and determines that the output's partitioning method is blank.

Step 1609: The algorithm propagates partitioning method "by v2, v3" from the dataset access reference 224 to the temporary dataset "temp2" 206.

Steps 1607, 1603, 1604: The algorithm finishes work on Application Step2.

The state of the graph at this time is shown in FIG. 14. The algorithm continues as follows:

Steps 1600, 1602: The algorithm selects Application Step 3 (processing step 207) for processing.

Steps 1603, 1605, 1606, 1608, 1610: The algorithm selects Application Step 3's input 225 for processing and determines that it needs to insert an adapter and temporary dataset between the temporary dataset "temp2" 206 and the processing step 207.

Step 1611: The adapter is inserted, as above (see FIG. 15). This time, a "gather" adapter is chosen, because the dataset access reference 225 specifies "serial" partitioning. This results in the creation of an adapter Application Step 3a 216, a temporary dataset "temp6" 217, and two dataset references 233, 234.

Steps 1607, 1603, 1605, 1606: The algorithm selects Application Step 3's output 226 for processing, and determines that the partitioning for the dataset access reference 226 matches the partitioning of the output dataset "outdata" 208.

Steps 1607, 1603, 1604: The algorithm marks Application Step 3's output 226 as "processed", and determines that Application Step 3 has no further dataset accesses.

Steps 1600, 1601: The algorithm determines that there are no unprocessed processing steps, and terminates.

The final state of the graph, now fully parallelized, is shown in FIG. 15. This constitutes the parallelized dataflow graph 106.

4. Step 107—Generating Script Fragments

Figure 16:
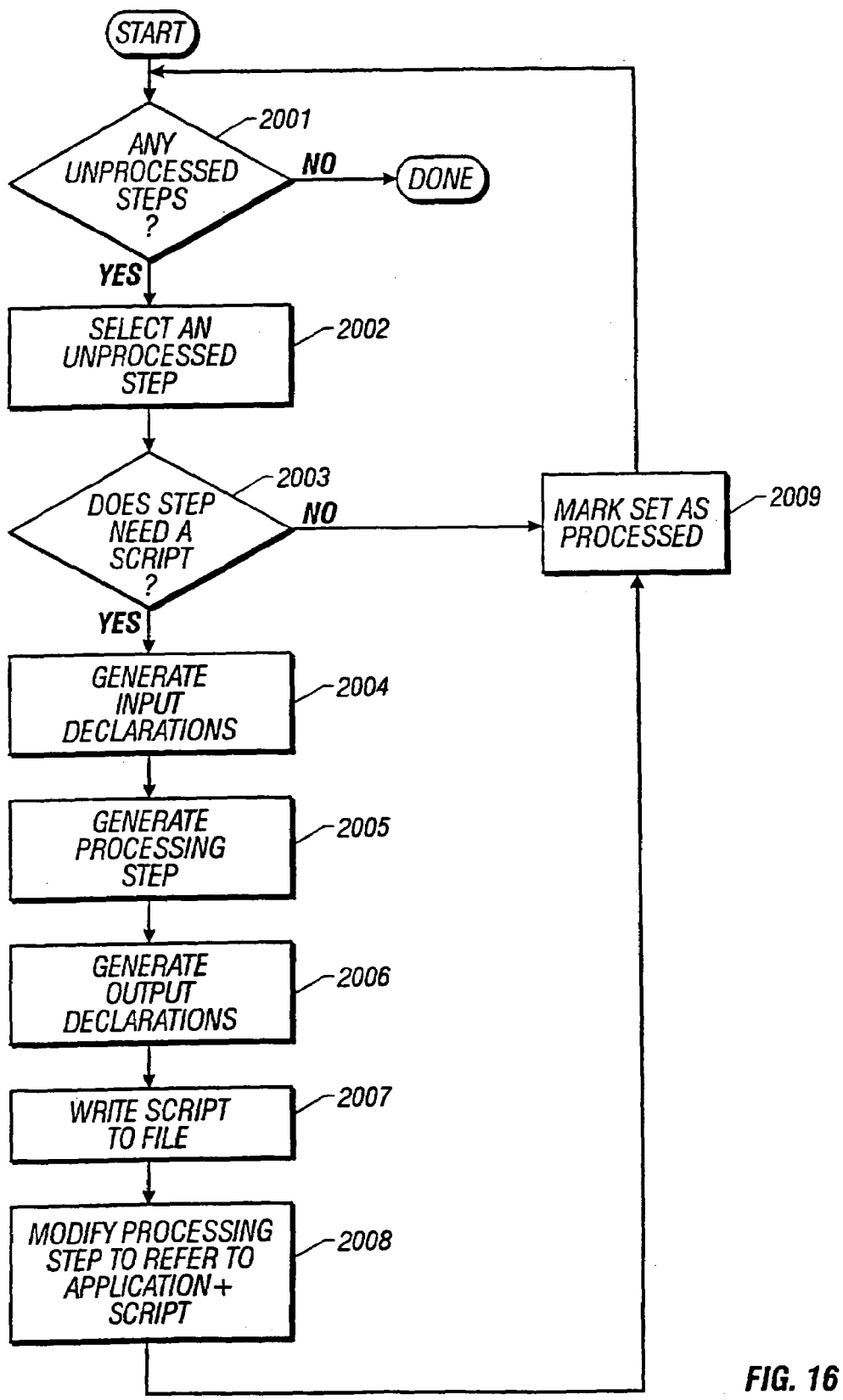
FIG. 16 is a flowchart showing a preferred method for generating script fragments.

In many cases, the original script-driven tool 6 may be used to implement some processing steps. To do this, an embodiment of the invention may optionally generate script fragments 4 for these processing steps. FIG. 16 is a flowchart showing a preferred method for generating script fragments:

Step 2001: The system determines whether all steps have been completed. If so, the algorithm terminates.

Step 2002: The system selects an unprocessed step.

Step 2003: If the step is not to be implemented via the original tool 6, then it is marked as processed (Step 2009) and the algorithm repeats (at Step 2001). For each processing step which is to be implemented via the original tool 6, the following actions will be taken:

Step 2004: Declarations for any inputs are generated. The declarations may make reference to information which is available at run-time. For example, the declarations may reference command-line arguments.

Step 2005: The text of the processing step itself is generated. In many cases, the text of the processing step will be identical to that found in the original script 1.

Step 2006: Declarations for any outputs are generated. The declarations may make reference to information which is available at run-time. For example, the declarations may reference command-line arguments.

Step 2007: The input declarations, processing step, and output declarations are written to a file. This file is called a "script fragment" 4 and will generally contain a fragment of the original script. FIG. 17 shows an example of a script fragment file containing several scripts.

Step 2008: The parallel processing step table 802 is modified to reference the script, and to note that the step is implemented by invoking the script-driven tool 6.

Step 2009: The current step is marked as processed, and the algorithm repeats (at Step 2001).

For example, the application shown in FIG. 15 contains three processing steps 203, 205, 207 which require script generation. The result, shown in FIG. 17, consists of three script fragments 2101, 2102, 2103.

The first script fragment 2101, Script 1, corresponds to the first processing step 203, and declares two input datasets (indata1 and indata2) and one output dataset (outdata), plus a single processing step (the CONCATENATE operation). The names of the files used by the datasets generally will be obtained from the command line (see parameters listed in FIG. 15).

The second script fragment 2102, Script 2, corresponds to the second processing step 205, and declares a single input and output (indata, outdata) and a single processing step (the AGGREGATE operation). The names of the files used by the datasets generally will be obtained from the command line.

The third script fragment 2103, Script 3, corresponds to the third processing step 207, and declares a single input and output (indata, outdata) and a single processing step (the ANALYZE operation). The names of the files used by the datasets generally will be obtained from the command line.

References to the scripts and the analyze application are then inserted into the parallel processing step table 802. FIG. 18 is a diagram showing FIG. 15 after generation of script fragments. Note that, at this point, the parallel processing step table 802 consists entirely of constructs which the parallel infrastructure can directly execute.

5. Step 108—Generating the Parallel Computation Specification

In some embodiments, the parallel data flow graph 106 can be executed directly, using the techniques taught in U.S. patent application Ser. No. 08/678,411. However, it is generally useful to generate a parallel computation specification that combines all datasets and parallel processing operations from the parallel dataset, processing step, and dataset access tables into one file. One form of this file may be a text file. This has an advantage when using a run-time system that accepts text file input. Accordingly, in the preferred embodiment, the final step in analyzing 2 a script is generation 108 of such a parallel computation specification.

Figure 19:
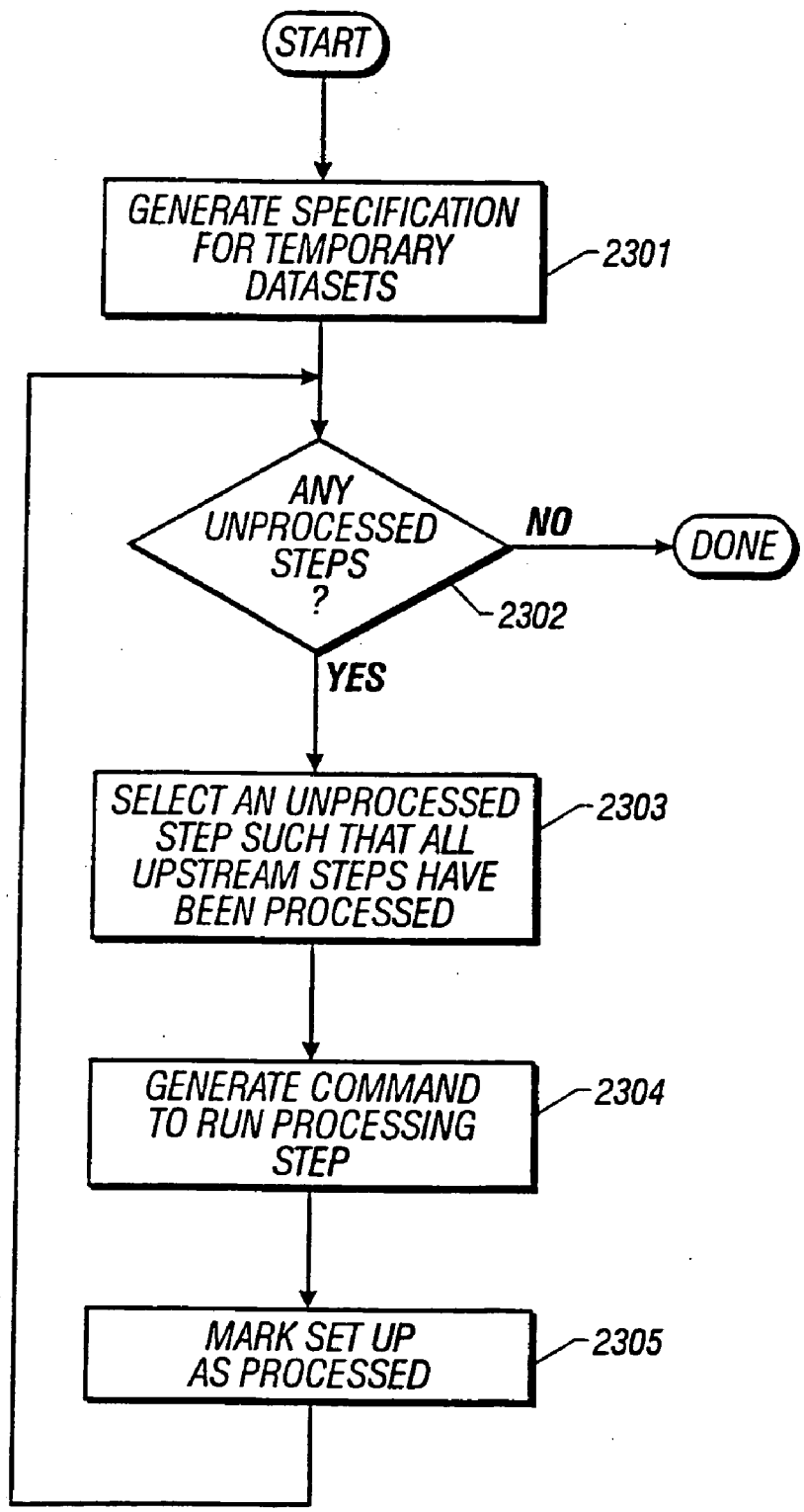
FIG. 19 is a flowchart of one method of generating a parallel computation specification.

FIG. 19 is a flowchart of one method of generating a parallel computation specification. In the preferred embodiment, this algorithm proceeds as follows:

Step 2301: The system generates a specification for each temporary dataset. For example, this could be done by generating a list of file names used to store each temporary dataset. For parallel datasets, some fixed number n of files could be generated, whereas a single file could be specified for serial files.

Step 2302: If no unprocessed steps remain, the process is done.

Step 2303: Otherwise, the algorithm selects a next unprocessed processing step such that all upstream processing steps have been processed previously.

Step 2304: The system generates a parallel command to run the selected processing step.

Step 2305: The current processing step is marked as processed, and the algorithm loops to test for any unprocessed steps (at Step 2302)

FIG. 20 is a diagram showing the generation of temporary datasets. A list of two temporary files has been generated for each parallel temporary dataset 204, 206, 212, 213, 215, and a single temporary file has been generated for each serial temporary dataset 217.

FIG. 21 is a diagram showing the final parallel computation specification 3. Each processing step from the parallel processing step table 802 in FIG. 20 has been encoded as one of the four supported statements in the example parallel runtime system (i.e., run, simple-partition, hash-partition, gather). Each reference from the dataset access reference table 803 in FIG. 20 has been specified by including lists of dataset filenames on the command lines.

The parallel computation specification 3 plus the script fragments 4 are then executed by a parallel runtime system 5 which causes multiple instances of the original software tool 6 and/or supplemental programs 7 to be run in parallel. The resulting processes 6, 7 perform the same computation as was specified by the original script 1 but with substantial improvements in overall "throughput".

EXAMPLES OF PARALLELIZATION METHODS

This section will briefly describe several methods of parallelization which can be used to define a parallelization repertoire table or database 900 (FIG. 8).

1. Parallelization by Simple Partitioning

In many cases, it is possible to parallelize a processing step by partitioning the data and then running one instance of the processing step on each partition. This is typically helpful when (1) some operation is performed on individual records, and (2) the operation performed on one record is independent of the operation performed on any other record. As used with the present invention, this technique is referred to as "simple partitioning." Any partitioning method may be used, preferably one in which roughly equal quantities of data will be present in each partition.

Figure 22:
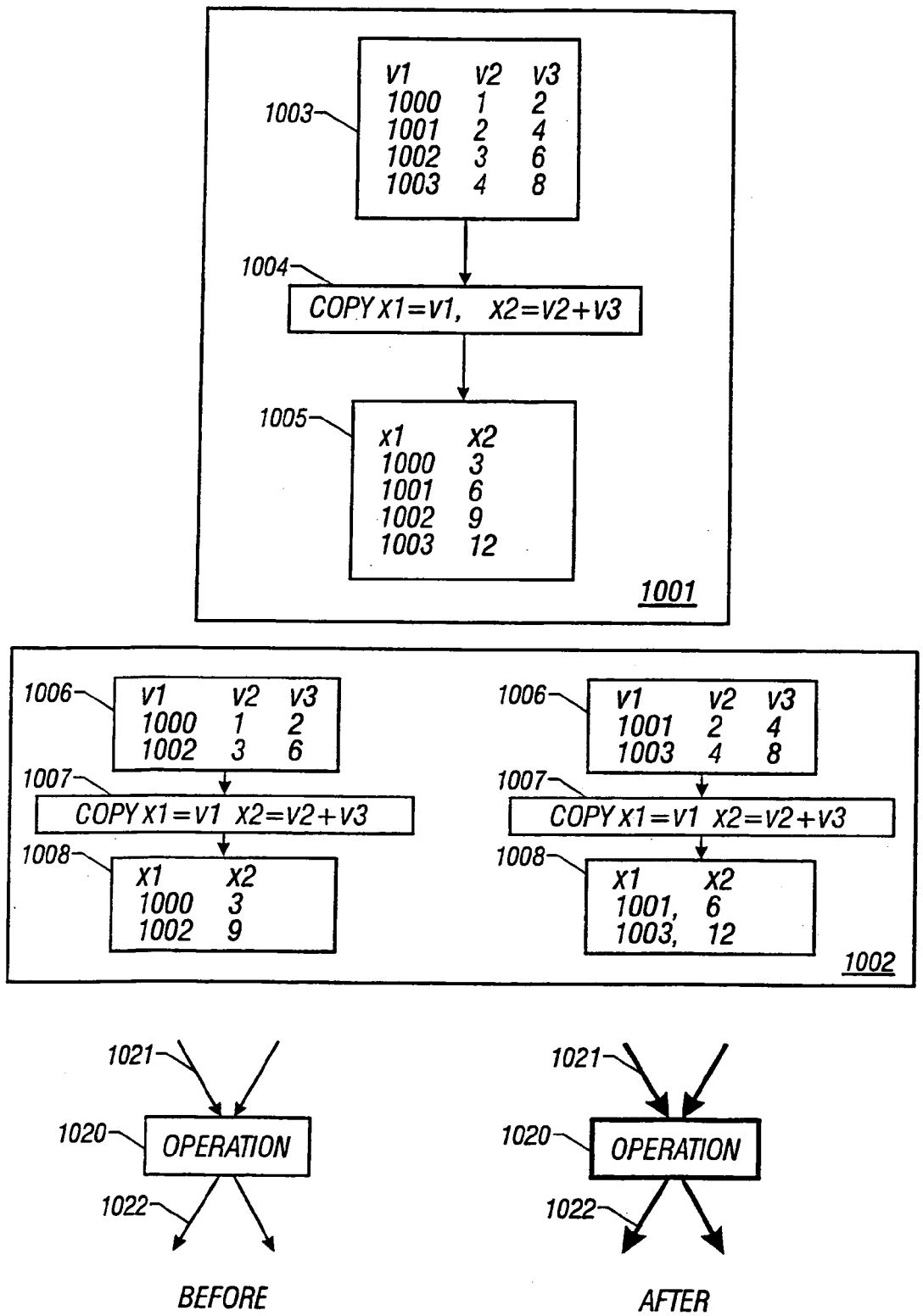
FIG. 22 is a dataflow diagram showing an example of parallelizing the COPY operation.

In the hypothetical analyze application described above, the CONCAT and COPY operations may be parallelized by simple partitioning (parallelization rule 903 in FIG. 8). FIG. 22 is a dataflow diagram showing an example of parallelizing the COPY operation. In the serial version 1001 of the operation, a serial dataset 1003 might be processed by a COPY processing step 1004, producing an output dataset 1005. In the parallel version 1002 of the COPY operation, the input dataset 1003 would be divided into N partitions 1006. N instances of the COPY operation 1007 would then be run, each accessing an input data partition 1006. The results would then be written to N output datasets 1008. Note that the output datasets 1008 constitute a partitioned representation of the output 1005 produced by the serial version of the program.

In the preferred embodiment, the rewrite rule 902 for the simple partitioning strategy generates an "after" dataflow symbol by use of heavy line weight for the "before" operation 1020 plus its inputs 1021 and outputs 1022.

2. Parallelization by Key-Based Partitioning

Many operations may be parallelized by partitioning one or more inputs data based on a "key field." This is typically helpful in cases where (1) some operation is performed on sets of records sharing a common value for a key, and (2) operations performed on one such set of records are independent of operations performed on a different set of records.

As used with the present invention, this technique is referred to as "key-based partitioning." Key-based partitioning requires that data be divided into partitions, such that if two records r1 and r2 have the same values for the key k, they will end up in the same partition. For example, this may be accomplished by:

Defining a hash function, that is, a numerical function $f$ which, when applied to a key value v produces a value h such that $0 < h <= N$. (N is the number of partitions).

Applying that hash function $f$ to each record in the input dataset and steering those records to the correct partition according to the value of h.

Figure 23:
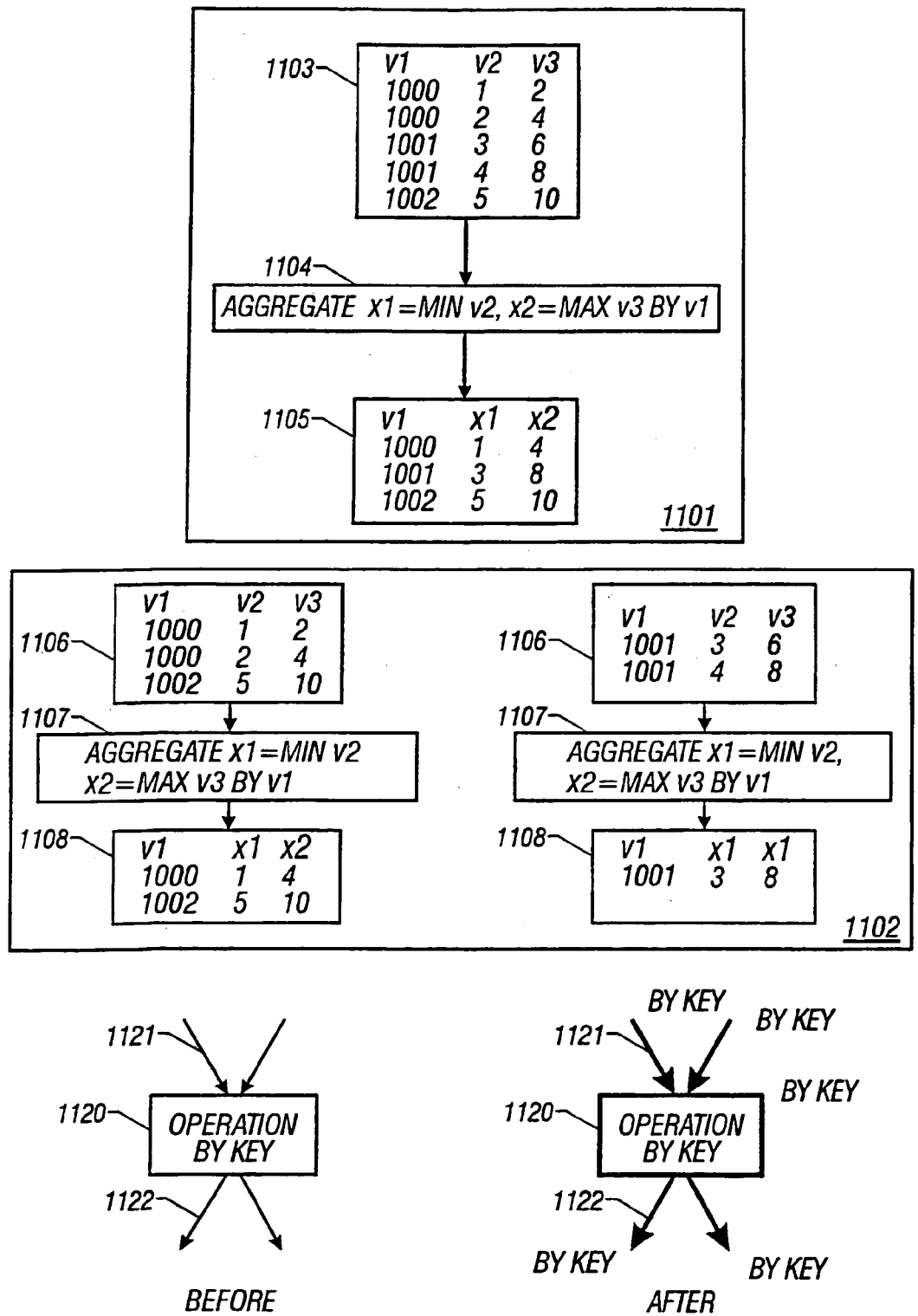
FIG. 23 is a dataflow diagram showing an example of parallelizing the AGGREGATE operation.

In the hypothetical analyze application, the AGGREGATE and ANALYZE operations may incorporate a "BY" clause. Such cases may be parallelized using key-based partitioning (see parallelization rule 904 in FIG. 8). FIG. 23 is a dataflow diagram showing an example of parallelizing the AGGREGATE operation. In the serial version 1101, a serial dataset 1103 might be processed by the AGGREGATE processing step 1104 containing a BY clause, producing an output dataset 1105. In the parallel version 1102 of the AGGREGATE operation, the input dataset 1103 would be divided into N partitions 1106 by use of a hash function. N instances of the AGGREGATE operation 1107 would then be run, each accessing one partition 1106 of the input data. The results would then be written to N output datasets 1108. Note that the output datasets 1108 constitute a key-partitioned representation of the output 1105 produced by the serial version of the program.

In the preferred embodiment, the rewrite rule 902 for the key-based partitioning strategy marks the "before" processing step 1120 plus its inputs and outputs 1121, 1122 as "partitioned by key". This is graphically indicated by the use of heavy line weight in an "after" dataflow graph symbol plus a notation as to the key.

3. Access to Partitioned Data Files

The advantages of parallelism are by no means restricted to computation. In particular, parallelism has the potential to vastly speed up access to data. For example, if a single storage device can transfer data at a rate of 5 megabytes/second, then a collection of 10 such devices might transfer data at a rate of 50 megabytes/second. For this reason, it is advantageous to partition data across multiple storage devices.

Figure 24:
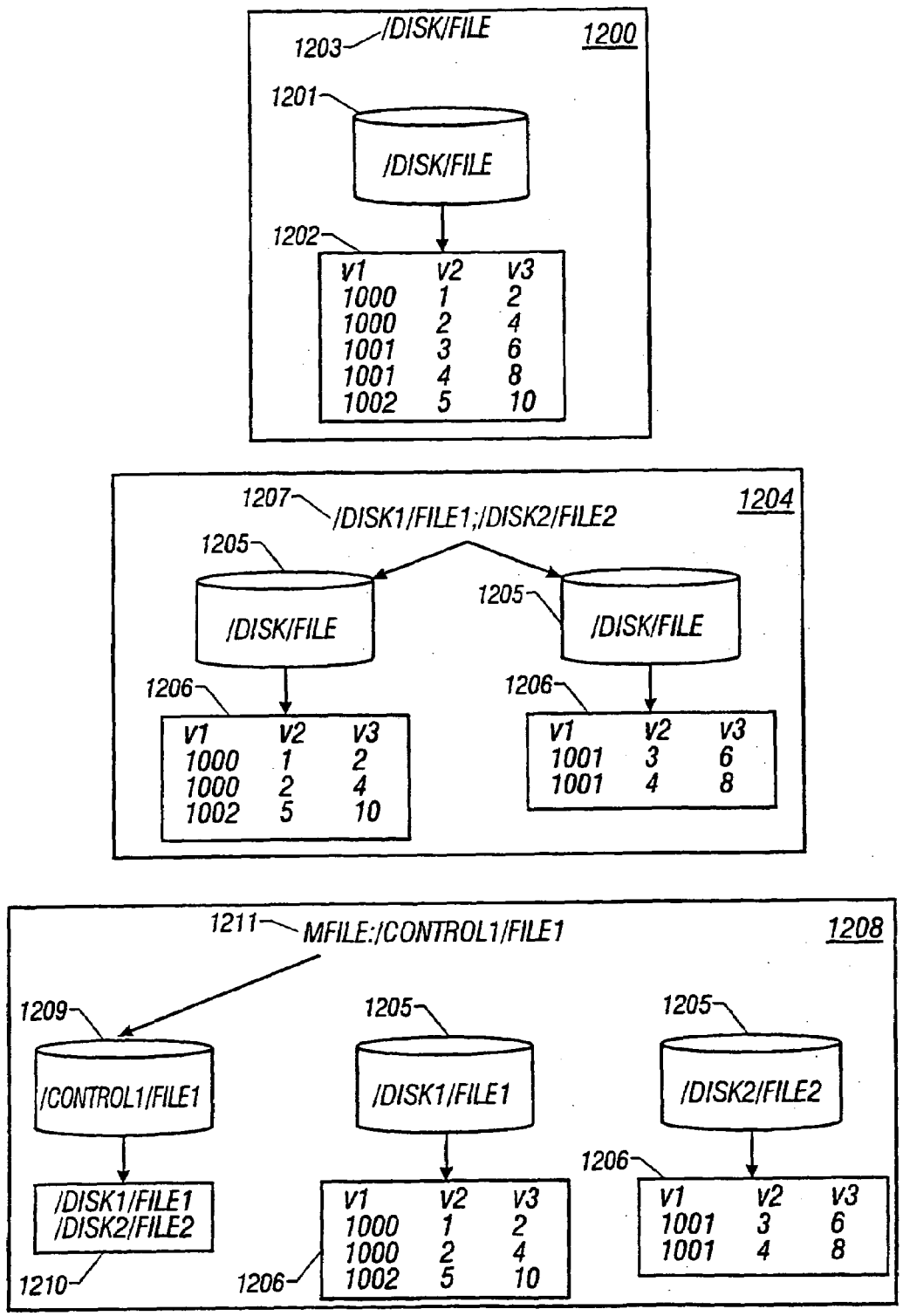
FIG. 24 is a block diagram showing one method for storing a partitioned dataset.

FIG. 24 is a block diagram showing one method for storing a partitioned dataset. This method partitions the records in the dataset across multiple files, preferably arranging for each file to be stored on a different disk. The method can best be understood by comparison with the method used in serial files. In the serial case 1200, a single file 1201 is used to store a set of records 1202. This dataset is referenced by a single filename 1203. In a partitioned dataset 1204, several files 1205 are used, each of which stores a partition of the dataset 1206. In this case, a series of filenames 1207 may be used to reference the dataset. This series may preferably be represented as a single string with some delimiter character (e.g., a semicolon) used to separate the individual filenames within the list.

Allowed U.S. patent application Ser. No. 08/876,734, filed Jun. 16, 1997, entitled A PARALLEL VIRTUAL FILE SYSTEM, and assigned to the assignee of the present invention (the teachings and content of which are hereby incorporated by reference) describes an improved method for managing sets of files. Under this method 1208, a "control file" 1209 may be used to store the names 1210 of the data files 1205 comprising the partitioned dataset 1206. The partitioned dataset 1206 may then be referenced using a single filename 1211 which refers to the control file.

Support for partitioned datasets requires an entry 905 in the parallelization method repertoire table 900 having an applicability test 901 which examines the filename contained in a dataset to determine whether it refers to a partitioned dataset. The corresponding rewrite rule 902 sets the dataset's partitioning mode, e.g., to "simple" or some similar notation.

This method is unusual in that it slightly extends the functionality of the original tool 6, such that the parallel application can access partitioned data files 4. Parallelization by Local-Global Division Some processing steps produce output values which are computed based on the entire contents of the input datasets(s). For example, in the hypothetical analyze application, the AGGREGATE statement (not having a BY clause) may be called on to find the largest value of some field, computed across the entire input dataset. In many cases, it is possible to perform such data-set-wide computations by partitioning the input data, computing a "local result" for each partition, and computing the desired "global result" by combining the several "local results." In most cases the amount of non-parallel work done in the "global combination" step is quite small compared to the parallel work done in the "local computation" step. Preferably, both the "local" and "global" steps will be performed by the original software tool 6. If necessary, however, one or both steps may be implemented by new, special-purpose code.

Figure 25:
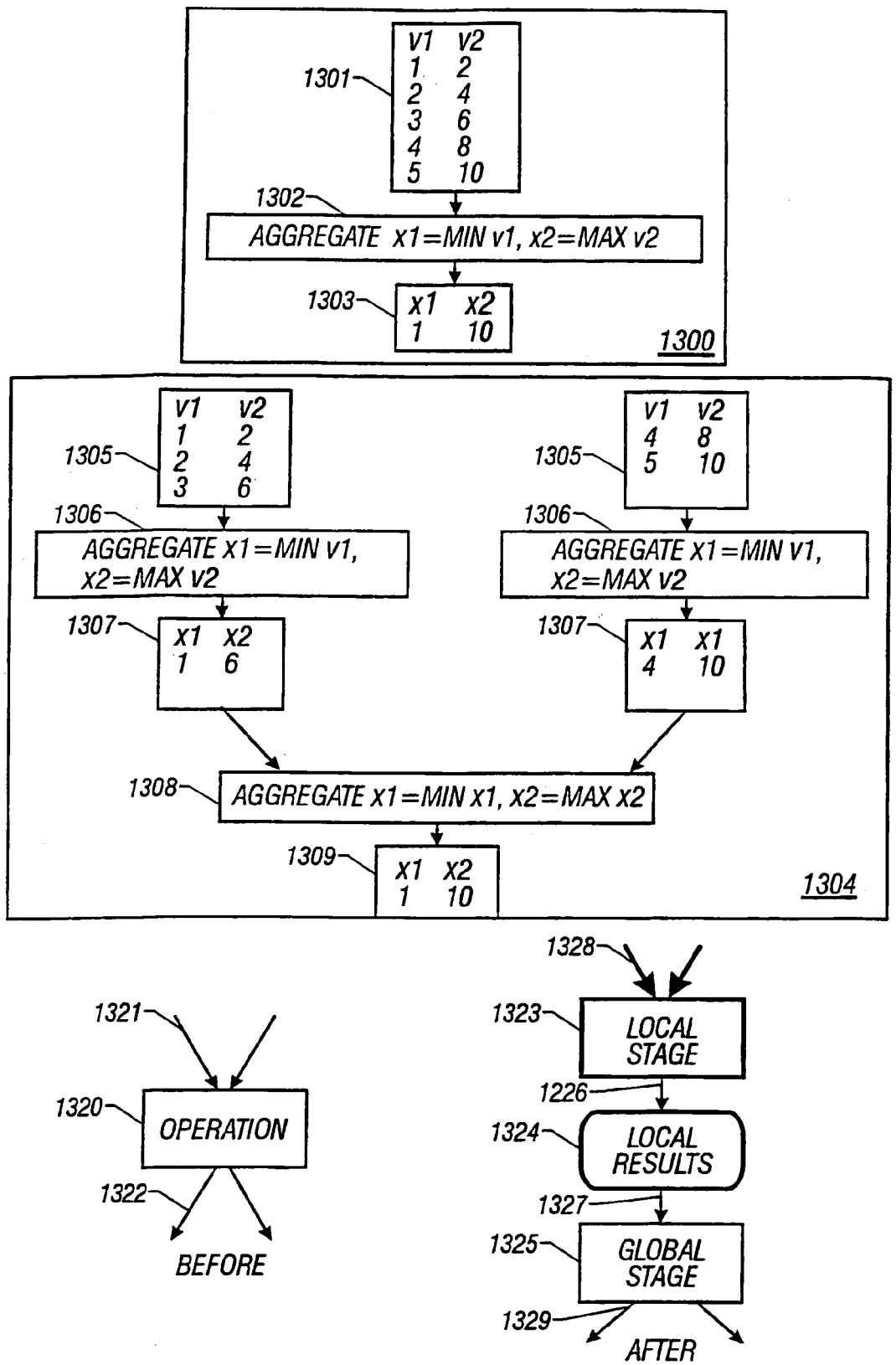
FIG. 25 is a dataflow diagram of local-global parallelization.

This method of parallelism is referred to as "Local-Global Division." The exact computation performed for the local and global stages is dependent on the processing step being parallelized. For the aggregate operation in the hypothetical analyze application, the local stage consists of computing a local aggregate as specified in the original script 1, then applying the same aggregation operation globally to the results of local aggregation. FIG. 25 is a dataflow diagram of local-global parallelization. In the serial operation 1300, one might start with a serial dataset 1301 and an aggregate operation 1302 which finds the minimum value of one field and the maximum value of another 1303. The parallel version of this operation 1304 would involve dividing the input into partitions 1305, then applying one instance of the aggregate operation 1306 to each partition. This will produce the minimum and maximum values of the two fields 1307 within each partition. These local results will then be fed into a global aggregation step 1308 to compute the minimum/maximum across the entire dataset 1309.

In the preferred embodiment, the rewrite rule 902 for Local-Global Division 906 consists of:

Replacing the original operation 1320 with a local operation 1323, a temporary intermediate dataset 1324, and a global operation 1325.

Adding dataset accesses between the local operation and the intermediate dataset 1326, and between the intermediate dataset and the global operation 1327.

Graphically marking the local operation 1323 and intermediate dataset 1324 as "partitioned" using heavy line weight.

Marking the global operation 1325 as serial using light line weight.

Graphically marking access references 1326, 1327 to the intermediate dataset as partitioned using heavy line weight.

Attaching the inputs 1321 of the original operation 1320 to the local stage 1323 and graphically marking them as partitioned 1328 using heavy line weight.

Attaching the outputs 1322 of the original operation 1320 to the global stage 1325 and graphically marking them as serial 1329 using light line weight.

5. External Parallelism—Supplemental Programs

There may be cases where the original software tool 6 cannot be used to parallelize some processing step. In such cases it may be possible to introduce an "External Parallel" implementation of the step. An External Parallel implementation is a supplemental program which replicates some of the functionality in the original application in a way which allows the function to be parallelized. The implementation of such an External Parallelization routine depends on the nature of the operation being parallelized. This section describes the general method by which such external routines are integrated into the parallel version of an application.

For example, the hypothetical analyze application includes a "database unload" operation which cannot be parallelized by, for example, partitioning the database table being unloaded (doing so would require unacceptable modifications to the database table). This might, however, be parallelized by providing an "external parallel database unload" program. FIG. 26 is a dataflow diagram showing an example of External Parallelism. The original serial application 1400 might call for a database table 1401 to be accessed using its own "intrinsic unload" routine 1402, allowing the routine 1402 to access a set of data records 1403. A parallel implementation 1404 would take the same database table 1401 and use several instances of an "external unload" program 1405 to jointly scan the database table, such that each program produces a partition 1406 of the original table.

In the preferred embodiment, the rewrite rule 902 for External Parallelization 907, 908 consists of:

Replacing the original operation 1420 with an external parallel routine 1423.

In most cases, graphically marking the external parallel routine 1423 for partitioned execution using heavy line weight.

In most cases, graphically marking the inputs 1421 and outputs 1422 and corresponding partitioned data access references 1424, 1425 using heavy line weight.

6. Parallelization by Statement Decomposition

There may be cases where the original software tool 6 cannot be used to parallelize some processing step and it is not desirable or possible to use External Parallelism to parallelize the step. In such cases it may be possible to parallelize the processing step through Statement Decomposition. Statement Decomposition can be used when a processing step performs multiple independent tasks. When this is the case, a processing step can be parallelized by decomposing the original tasks of the step into separate tasks each of which then is processed in a separate step. Each of these new steps can then be processed simultaneously, effectively achieving parallel execution of the original step. The results of the decomposed steps are then concatenated together to form a serial output.

Figure 27:
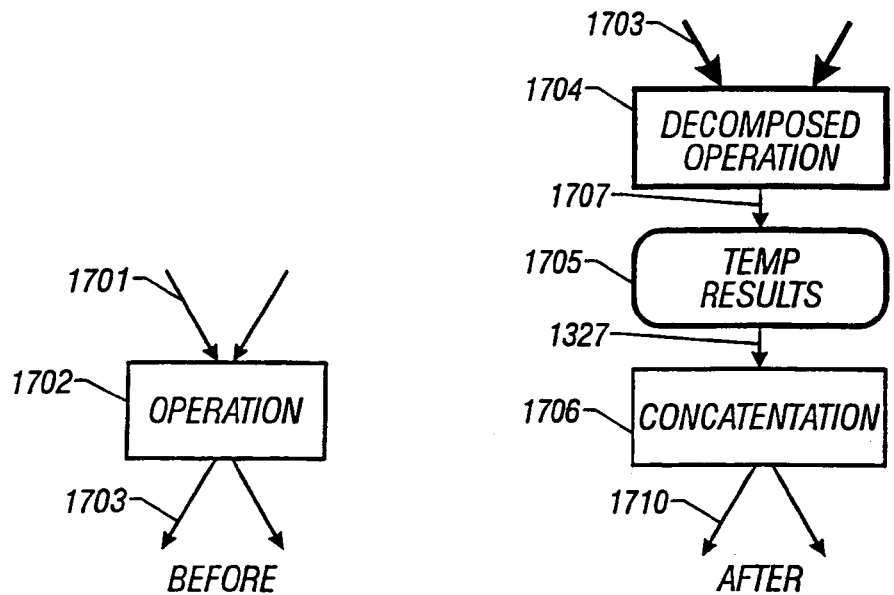
FIG. 27 is a dataflow diagram showing an example of Statement Decomposition.

FIG. 27 is a dataflow diagram showing an example of Statement Decomposition. In the preferred embodiment, the rewrite rule 902 for parallelization by Statement Decomposition consists of:

Replacing the original operation 1702 with the combination of a decomposed operation 1704, a temporary intermediate dataset 1705, and a field concatenation operation 1706. The field concatenation operation 1706 concatenates the fields of the records in the temporary intermediate dataset 1705.

Adding dataset accesses 1707, 1708 between the decomposed operation and the intermediate dataset, and between the intermediate dataset and the concatenation operation, respectively.

Graphically marking the decomposed operation 1704 and the intermediate dataset 1705 as "partitioned" using heavy line weight.

Marking the concatenation operation 1706 as serial using light line weight.

Graphically marking accesses 1707, 1708 to the intermediate dataset as partitioned using heavy line weight.

Attaching the inputs 1701 of the original operation 1702 to the decomposed operation 1704 and graphically marking them as partitioned 1709 using heavy line weight.

Attaching the outputs 1703 of the original operation 1702 to the concatenation operation 1706 and marked them as serial 1710 using light line weight.

REWRITE RULES PARTICULAR TO SAS

While the invention has general applicability to a variety of scripting languages, the following provides some examples of how the invention may be adapted to the SAS language in particular. One of ordinary skill in the art should be able to apply the principles and examples herein to adapt other aspects of SAS for use with the present invention.

1. PROC MEANS Rewrite Rule—Example of a Local-Global Division

Figure 28:
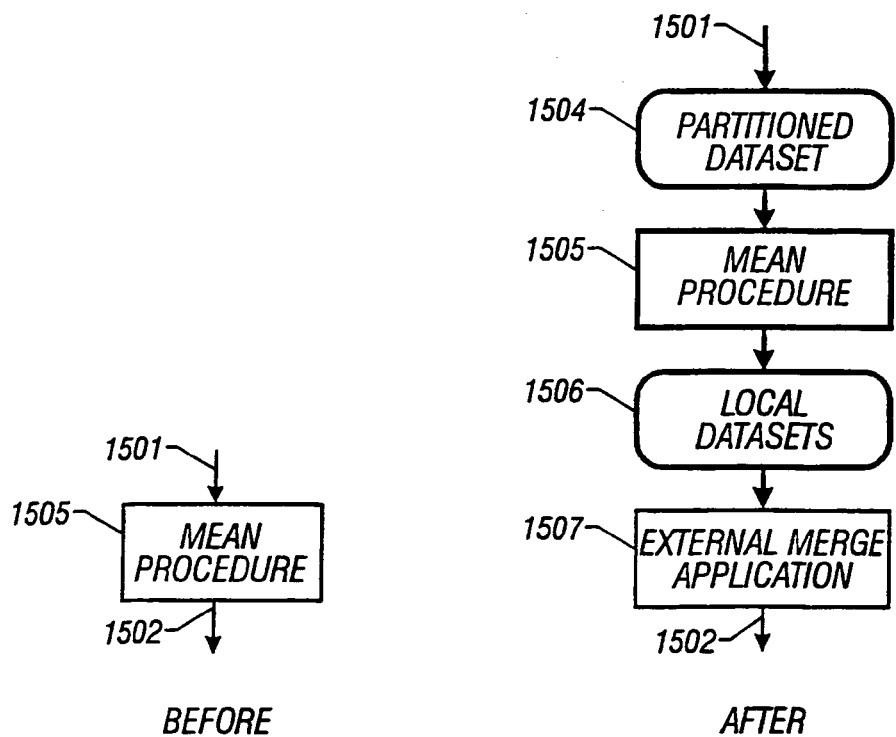
FIG. 28 is a dataflow diagram showing an example of a serial SAS script that uses the MEANS procedure to calculate descriptive statistics on a dataset and produce an output file.

The SAS System includes a MEANS procedure which cannot always be parallelized by, for example, Simple or Key-based partitioning. However, the MEANS procedure generally can be parallelized by applying a Local-Global Division rewrite rule. FIG. 28 is a dataflow diagram showing an example of a serial SAS script that uses the MEANS procedure 1505 to calculate descriptive statistics on a dataset 1501 and produce an output file 1502. A parallel implementation would take the same dataset 1501, use simple partitioning to produce a partitioned dataset 1504, and then use several instances of the SAS MEANS procedure 1505 to produce local values for the minimum, maximum, count, sum, and sum of squares values for the dataset 1506. A single instance of an external statistics merging application 1507 combines the local values to produce the global result 1502. The algorithms necessary to merge the local values 1506 and produce the global result 1502 are well known in the art.

2. PROC FREQ Rewrite Rule—Example of Local-Global Division

Figure 29:
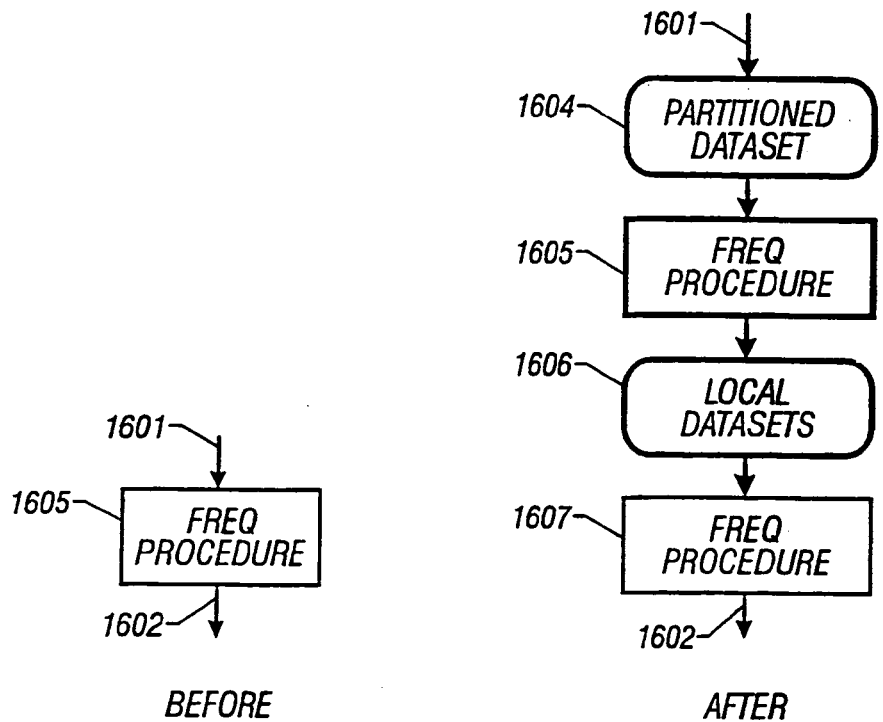
FIG. 29 is a dataflow diagram showing an example of a serial SAS script that uses the FREQ procedure to calculate table driven statistics on a dataset and produce an output file.

The SAS System includes a FREQ (frequency) procedure which cannot always be parallelized by, for example, Simple or Key-based partitioning. However, the FREQ procedure generally can be parallelized by applying a Local-Global Division rewrite rule. FIG. 29 is a dataflow diagram showing an example of a serial SAS script that uses the FREQ procedure 1605 to calculate table driven statistics on a dataset 1601 and produce an output file 1602. A parallel implementation would take the same dataset 1601, use simple partitioning to produce a partitioned dataset 1604, and then use several instances of the SAS FREQ procedure 1605 to produce local frequency tables for the dataset 1606. A single instance the FREQ procedure 1607 combines the local values to produce the global result 1602. (In order to comply with the language requirements of the current embodiment of SAS, the single FREQ instance 1607 must contain the SAS statement "WEIGHT COUNT" in order to properly merge the local results 1606.)

3. PROC UNIVARIATE Rewrite Rule—Example of Statement Decomposition

Figure 30:
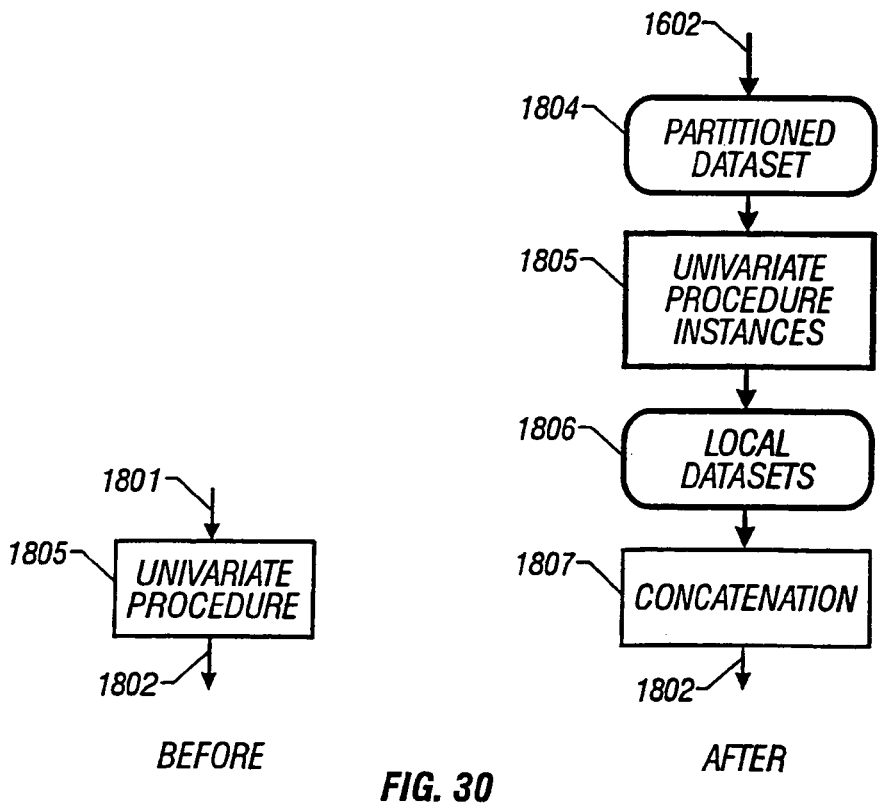
FIG. 30 is a dataflow diagram showing an example of a serial SAS script that uses the UNIVARIATE procedure to calculate univariate statistics on a dataset and produce an output file.

The SAS System includes the UNIVARIATE procedure which cannot be parallelized by, for example, Simple or Key-based partitioning. The UNIVARIATE procedure generally can be parallelized by applying a Statement Decomposition rewrite rule. FIG. 30 is a dataflow diagram showing an example of a serial SAS script that uses the UNIVARIATE procedure 1805 to calculate univariate statistics on a dataset 1801 and produce an output file 1802. A parallel implementation would take the same dataset 1801, use column partitioning to produce a partitioned dataset 1804, and then use several instances of the SAS UNIVARIATE procedure 1805, each producing univariate statistics for each variable (column partition) and creating a local dataset 1806. A single concatenation step 1807 then combines the local univariate datasets 1806 to produce the global result 1802.

4. Datasteps Rewrite Rule—Example of Simple Partitioning or Key-Based Partitioning The SAS System includes a procedural step called a "datastep". In general, SAS programs are composed of a series of datasteps and SAS procedures. SAS datasteps can perform single or grouped record operations analogous to the AGGREGATE statement in the script language of the hypothetical analyze application. When a SAS datastep uses SAS datasets for input and output and does not contain a BY statement, Simple Partitioning may be used to compute the datastep in parallel. When a SAS datastep uses SAS datasets for input and output and does contain a BY statement, parallelization by Key-Based Partitioning may be used to compute the datastep in parallel. In this latter case, the key specified in the SAS BY statement is used as the key in the hash partition operation.

5. SAS Script Fragments

Following This is an example of a SAS program and the fragments it would be broken into. Note that these fragments need to be modified to fit within the structure of the particular rewrite rule that is being applied. Additionally, references to temporary datasets (anywhere 'one' appears below, i.e., a dataset name that does not have a prefix from a libname statement) need to be replaced with the appropriate reference to the serial or parallel dataset created by the rewrite rule.

```
libname ext ".";
data one;
   set ext.customer;
   by region;
   age=today( )-birthdt;
proc means data=one;
   var age;
proc freq data=one;
   tables age*region;
proc univariate data=one;
```

```
var age income numkids;
Fragment 1:
libname ext ".";
data parallel.one;
    set ext.customer;
    by region;
    age=today ( )-birthdt;
Fragment 2:
proc means data=parallel.one;
    var age;
Fragment 3:
proc freq data=one;
    tables age*region;
Fragment 4:
proc univariate data=one;
    var age income numkids;
```

6. Macros and Preprocessors

The SAS language allows users to create and use "macros" (collections of commands) for convenience. However, macros "hide" the underlying SAS commands. In order to more easily apply practical embodiments of the invention to a SAS script, all macros should be expanded to expose the original underlying commands. Since current embodiments of the SAS system do not provide tools specifically for macro expansion, alternative methods may be used. For example, in one embodiment, the expanded form of macros may be obtained by executing an original SAS program in a syntax checking mode. Current embodiments of SAS generate a log file from this activity that in essence contains all of the underlying SAS commands in expanded form. By reading and parsing the log file, a version of the "raw" SAS code can be obtained and processed through the analyzer 2 of the present invention. (Note that the log file is not legal SAS code per se and must be mapped or interpreted to legal commands, a straightforward process).

An alternative method for obtaining the expanded form of macros would be to write a macro preprocessor for the SAS macro language. Such preprocessors and methods for writing them are well-known in the art.

7. Global SAS Data

The SAS system creates and references global data in two major areas: macro variables and formats. In both cases, creation and reference to such global data can be detected by examination of the SAS parse tree. For example, referring to FIGS. 6 and 7, creation of global data by a SAS step can be detected while statements are being scanned 501. Any such references causes a global data entry to be created in the dataset table 601. In addition, reference to global data by a SAS step is found and noted when the dataset access table 603 is being created in Step 505. In this manner, any macro variables or SAS formats which are created will be provided to later SAS steps which require them.

COMPUTER EMBODIMENTS

The invention may be implemented in hardware or software, or a combination of both. Unless otherwise specified, the algorithms included as part of the invention are not inherently related to any particular computer or other apparatus. In particular, various general purpose machines may be used with programs written in accordance with the teachings herein, or it may be more convenient to construct more specialized apparatus to perform the required method steps. However, preferably, the invention is implemented in one or more computer programs executing on programmable systems each comprising at least one processor, at least one data storage system (including volatile and non-volatile memory and/or storage elements), at least one input device, and at least one output device. Program code is applied to input data to perform the functions described herein and generate output information. The output information is applied to one or more output devices, in known fashion.

Each such program may be implemented in any desired computer language (including machine, assembly, high level procedural, or object oriented programming languages) to communicate with a computer system. In any case, the language may be a compiled or interpreted language.

Each such computer program is preferably stored on a storage media or device (e.g., ROM, CD-ROM, or magnetic or optical media) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the present invention have been described. Nevertheless, it will be understood that various modifications may be made without departing from the spirit and scope of the invention. For example, steps may be performed in different sequences and still achieve the same result. Accordingly, other embodiments are within the scope of the following claims.

What is claimed is:

1. A method for parallelizing a computer application program based on a script of a script-driven software tool, comprising automatically analyzing the script and producing a parallel computation specification based on such analysis, where such parallel computation specification provides functional equivalence to the script when executed by a parallel runtime system, by:
   (a) parsing the script into statements comprising at least processing steps and dataset definitions;
   (b) constructing a serial dataflow graph from the parsed statements, the serial dataflow graph having nodes connected by directed edges, the nodes representing datasets, processing steps, and intermediate results; and
   (c) constructing a parallel dataflow graph from the nodes of the serial dataflow graph such that the parallel dataflow graph may be executed by a parallel runtime system.

2. A method for parallelizing a computer application program based on a script of a script-driven software tool, comprising automatically analyzing the script and producing a parallel computation specification plus a script fragment set based on such analysis, where such parallel computation specification and script fragment set provides functional equivalence to the script when executed by a parallel runtime system, by:
   (a) parsing the script into statements comprising at least processing steps and dataset definitions;
   (b) constructing a serial dataflow graph from the parsed statements, the serial dataflow graph having nodes connected by directed edges, the nodes representing datasets, processing steps, and intermediate results;
   (c) constructing a parallel dataflow graph from the nodes of the serial dataflow graph such that the parallel dataflow graph may be executed by a parallel runtime system; and
   (d) analyzing the parallel dataflow graph to generate script fragments in a form that enables the script-driven software tool to execute some of the processing steps.

3. The method of claims 1 or 2, wherein constructing the serial dataflow graph includes:
   (a) constructing a serial dataset table of datasets used by the script;
   (b) constructing a serial processing step table of statements performed by the script; and
   (c) constructing a serial dataset access table indicating datasets in the dataset table used by statements in the processing step table.

4. The method of claim 3, wherein constructing the parallel dataflow graph includes:
   (a) constructing a parallel dataset table of datasets based on the serial dataset table;
   (b) constructing a parallel processing step table of statements based on the serial processing step table;
   (c) constructing a dataset access table based on the serial dataset access table; and
   (d) determining, for each processing step identified in the parallel processing step table, if a corresponding pre-defined parallelization rewrite rule exists for such processing step, and if so, then applying the corresponding pre-defined parallelization rewrite rule to redefine associated entries in the parallel dataset table, the parallel processing step table, and the dataset access table as parallel processing entries; and if not, then defining such associated entries as serial processing entries.

5. The method of claim 4, further including resolving any existing partitioning conflicts in the constructed parallel dataflow graph.

6. The method of claim 4, wherein at least one pre-defined parallelization rewrite rule is an algorithm selected from the group comprising simple partitioning, key-based partitioning, local-global division, external parallelism algorithm, and statement decomposition.

7. The method of claims 1 or 2, wherein the script-driven software tool is SAS®.

8. The method of claims 1 or 2, wherein producing the parallel computation specification includes applying at least one pre-defined parallelization rewrite algorithm selected from the group comprising simple partitioning, key-based partitioning, local-global division, external parallelism algorithm, and statement decomposition.

9. A computer program, residing on a computer-readable medium, for parallelizing a computer application program based on a script of a script-driven software tool, the computer program comprising instructions for causing a computer to automatically analyze the script and produce a parallel computation specification based on such analysis, where such parallel computation specification provides functional equivalence to the script when executed by a parallel runtime system, by:
   (a) parsing the script into statements comprising at least processing steps and dataset definitions;
   (b) constructing a serial dataflow graph from the parsed statements, the serial dataflow graph having nodes connected by directed edges, the nodes representing datasets, processing steps, and intermediate results; and
   (c) constructing a parallel dataflow graph from the nodes of the serial dataflow graph such that the parallel dataflow graph may be executed by a parallel runtime system.

10. A computer program, residing on a computer-readable medium, for parallelizing a computer application program based on a script of a script-driven software tool, the computer program comprising instructions for causing a computer to automatically analyze the script and produce a parallel computation specification plus a script fragment set based on such analysis, where such parallel computation specification and script fragment set provides functional equivalence to the script when executed by a parallel runtime system, by:
   (a) parsing the script into statements comprising at least processing steps and dataset definitions;
   (b) constructing a serial dataflow graph from the parsed statements, the serial dataflow graph having nodes connected by directed edges, the nodes representing datasets, processing steps, and intermediate results;
   (c) constructing a parallel dataflow graph from the nodes of the serial dataflow graph such that the parallel dataflow graph may be executed by a parallel runtime system; and
   (d) analyzing the parallel dataflow graph to generate script fragments in a form that enables the script-driven software tool to execute some of the processing steps.

11. The computer program of claims 9 or 10, wherein constructing the serial dataflow graph includes:
   (a) constructing a serial dataset table of datasets used by the script;
   (b) constructing a serial processing step table of statements performed by the script; and
   (c) constructing a serial dataset access table indicating datasets in the dataset table used by statements in the processing step table.

12. The computer program of claim 11, wherein constructing the parallel dataflow graph includes:
   (a) constructing a parallel dataset table of datasets based on the serial dataset table;
   (b) constructing a parallel processing step table of statements based on the serial processing step table;
   (c) constructing a dataset access table based on the serial dataset access table; and
   (d) determining, for each processing step identified in the parallel processing step table, if a corresponding pre-defined parallelization rewrite rule exists for such processing step, and if so, then applying the corresponding pre-defined parallelization rewrite rule to redefine associated entries in the parallel dataset table, the parallel processing step table, and the dataset access table as parallel processing entries; and if not, then defining such associated entries as serial processing entries.

13. The computer program of claim 12, further including resolving any existing partitioning conflicts in the constructed parallel dataflow graph.

14. The computer program of claim 12, wherein at least one pre-defined parallelization rewrite rule is an algorithm selected from the group comprising simple partitioning, key-based partitioning, local-global division, external parallelism algorithm, and statement decomposition.

15. The computer program of claims 9 or 10, wherein the script-driven software tool is SAS®.

16. The computer program of claims 9 or 10, wherein producing the parallel computation specification includes applying at least one pre-defined parallelization rewrite algorithm selected from the group comprising simple partitioning, key-based partitioning, local-global division, external parallelism algorithm, and statement decomposition.

17. A system for parallelizing a computer application program based on a script of a script-driven software tool, and for automatically analyzing the script and producing a parallel computation specification based on such analysis, where such parallel computation specification provides functional equivalence to the script when executed by a parallel runtime system, including:

(a) means for parsing the script into statements comprising at least processing steps and dataset definitions;
(b) means for constructing a serial dataflow graph from the parsed statements, the serial dataflow graph having nodes connected by directed edges, the nodes representing datasets, processing steps, and intermediate results; and
(c) means for constructing a parallel dataflow graph from the nodes of the serial dataflow graph such that the parallel dataflow graph may be executed by a parallel runtime system.

18. A system for parallelizing a computer application program based on a script of a script-driven software tool, and for automatically analyzing the script and producing a parallel computation specification plus a script fragment set based on such analysis, where such parallel computation specification and script fragment set provides functional equivalence to the script when executed by a parallel runtime system, including:
(a) means for parsing the script into statements comprising at least processing steps and dataset definitions;
(b) means for constructing a serial dataflow graph from the parsed statements, the serial dataflow graph having nodes connected by directed edges, the nodes representing datasets, processing steps, and intermediate results;
(c) means for constructing a parallel dataflow graph from the nodes of the serial dataflow graph such that the parallel dataflow graph may be executed by a parallel runtime system; and
(d) means for analyzing the parallel dataflow graph to generate script fragments in a form that enables the script-driven software tool to execute some of the processing steps.

19. The system of claims 17 or 18, wherein the means for constructing the serial dataflow graph includes means for:
(a) constructing a serial dataset table of datasets used by the script;
(b) constructing a serial processing step table of statements performed by the script; and
(c) constructing a serial dataset access table indicating datasets in the dataset table used by statements in the processing step table.

20. The system of claim 19, wherein the means for constructing the parallel dataflow graph includes means for:
(a) constructing a parallel dataset table of datasets based on the serial dataset table;
(b) constructing a parallel processing step table of statements based on the serial processing step table;
(c) constructing a dataset access table based on the serial dataset access table; and
(d) determining, for each processing step identified in the parallel processing step table, if a corresponding pre-defined parallelization rewrite rule exists for such processing step, and if so, then applying the corresponding pre-defined parallelization rewrite rule to redefine associated entries in the parallel dataset table, the parallel processing step table, and the dataset access table as parallel processing entries; and if not, then defining such associated entries as serial processing entries.

21. The system of claim 20, further including means for resolving any existing partitioning conflicts in the constructed parallel dataflow graph.

22. The system of claim 20, wherein at least one pre-defined parallelization rewrite rule is an algorithm selected from the group comprising simple partitioning, key-based partitioning, local-global division, external parallelism algorithm, and statement decomposition.

23. The system of claims 17 or 18, wherein the script-driven software tool is SAS®.

24. The system of claims 17 or 18, wherein the means for producing the parallel computation specification includes means for applying at least one pre-defined parallelization rewrite algorithm selected from the group comprising simple partitioning, key-based partitioning, local-global division, external parallelism algorithm, and statement decomposition.

25. A method for parallelizing a computer application program based on a script of a script-driven software tool, comprising automatically analyzing the script and producing a parallel computation specification based on such analysis, where such parallel computation specification provides functional equivalence to the script when executed by a parallel runtime system, by:
(a) parsing the script into statements;
(b) constructing a serial dataflow graph from the parsed statements, said constructing including
(i) constructing a serial dataset table of datasets used by the script,
(ii) constructing a serial processing step table of statements performed by the script, and
(iii) constructing a serial dataset access table indicating datasets in the dataset table used by statements in the processing step table; and
(c) constructing a parallel dataflow graph from the serial dataflow graph.

26. A method for parallelizing a computer application program based on a script of a script-driven software tool, comprising automatically analyzing the script and producing a parallel computation specification plus a script fragment set based on such analysis, where such parallel computation specification and script fragment set provides functional equivalence to the script when executed by a parallel runtime system, by:
(a) parsing the script into statements;
(b) constructing a serial dataflow graph from the parsed statements, said constructing including
(i) constructing a serial dataset table of datasets used by the script;
(ii) constructing a serial processing step table of statements performed by the script; and
(iii) constructing a serial dataset access table indicating datasets in the dataset table used by statements in the processing step table; and
(c) constructing a parallel dataflow graph from the serial dataflow graph.

27. A method for parallelizing a computer application program based on a script of a script-driven software tool, comprising automatically analyzing the script and producing a parallel computation specification based on such analysis, where such parallel computation specification provides functional equivalence to the script when executed by a parallel runtime system, by:
(a) parsing the script into statements;
(b) constructing a serial dataflow graph from the parsed statements, said constructing including
(i) constructing a parallel dataset table of datasets based on the serial dataset table;
(ii) constructing a parallel processing step table of statements based on the serial processing step table;
(iii) constructing a dataset access table based on the serial dataset access table; and (iv) determining, for each processing step identified in the parallel processing step table, if a corresponding pre-defined parallelization rewrite rule exists for such processing step, and if so, then applying the corresponding pre-defined parallelization rewrite rule to redefine associated entries in the parallel dataset table, the parallel processing step table, and the dataset access table as parallel processing entries; and if not, then defining such associated entries as serial processing entries; and (c) constructing a parallel dataflow graph from the serial dataflow graph.

28. A method for parallelizing a computer application program based on a script of a script-driven software tool, comprising automatically analyzing the script and producing a parallel computation specification plus a script fragment set based on such analysis, where such parallel computation specification and script fragment set provides functional equivalence to the script when executed by a parallel runtime system, by:

(a) parsing the script into statements;

(b) constructing a serial dataflow graph from the parsed statements, said instructing including
  (i) constructing a parallel dataset table of datasets based on the serial dataset table;
  (ii) constructing a parallel processing step table of statements based on the serial processing step table;
  (iii) constructing a dataset access table based on the serial dataset access table; and
  (iv) determining, for each processing step identified in the parallel processing step table, if a corresponding pre-defined parallelization rewrite rule exists for such processing step, and if so, then applying the corresponding pre-defined parallelization rewrite rule to redefine associated entries in the parallel dataset table, the parallel processing step table, and the dataset access table as parallel processing entries; and if not, then defining such associated entries as serial processing entries; and (c) constructing a parallel dataflow graph from the serial dataflow graph.

29. A computer program, residing on a computer-readable medium, for parallelizing a computer application program based on a script of a script-driven software tool, the computer program comprising instructions for causing a computer to automatically analyze the script and produce a parallel computation specification based on such analysis, where such parallel computation specification provides functional equivalence to the script when executed by a parallel runtime system, by:

(a) parsing the script into statements;

(b) constructing a serial dataflow graph from the parsed statements, said constructing including
  (i) constructing a serial dataset table of datasets used by the script;
  (ii) constructing a serial processing step table of statements performed by the script; and
  (iii) constructing a serial dataset access table indicating datasets in the dataset table used by statements in the processing step table; and (c) constructing a parallel dataflow graph from the serial dataflow graph.

30. A computer program, residing on a computer-readable medium, for parallelizing a computer application program based on a script of a script-driven software tool, the computer program comprising instructions for causing a computer to automatically analyze the script and produce a parallel computation specification plus a script fragment set based on such analysis, where such parallel computation specification and script fragment set provides functional equivalence to the script when executed by a parallel runtime system, by:

(a) parsing the script into statements;

(b) constructing a serial dataflow graph from the parsed statements, said constructing including
  (i) constructing a serial dataset table of datasets used by the script;
  (ii) constructing a serial processing step table of statements performed by the script; and
  (iii) constructing a serial dataset access table indicating datasets in the dataset table used by statements in the processing step table; and (c) constructing a parallel dataflow graph from the serial dataflow graph.

31. A computer program, residing on a computer-readable medium, for parallelizing a computer application program based on a script of a script-driven software tool, the computer program comprising instructions for causing a computer to automatically analyze the script and produce a parallel computation specification based on such analysis, where such parallel computation specification provides functional equivalence to the script when executed by a parallel runtime system, by:

(a) parsing the script into statements;

(b) constructing a serial dataflow graph from the parsed statements, said constructing including
  (i) constructing a parallel dataset table of datasets based on the serial dataset table;
  (ii) constructing a parallel processing step table of statements based on the serial processing step table;
  (iii) constructing a dataset access table based on the serial dataset access table; and
  (iv) determining, for each processing step identified in the parallel processing step table, if a corresponding pre-defined parallelization rewrite rule exists for such processing step, and if so, then applying the corresponding pre-defined parallelization rewrite rule to redefine associated entries in the parallel dataset table, the parallel processing step table, and the dataset access table as parallel processing entries; and if not, then defining such associated entries as serial processing entries; and (c) constructing a parallel dataflow graph from the serial dataflow graph.

32. A computer program, residing on a computer-readable medium, for parallelizing a computer application program based on a script of a script-driven software tool, the computer program comprising instructions for causing a computer to automatically analyze the script and produce a parallel computation specification plus a script fragment set based on such analysis, where such parallel computation specification and script fragment set provides functional equivalence to the script when executed by a parallel runtime system, by:

(a) parsing the script into statements;

(b) constructing a serial dataflow graph from the parsed statements, said constructing including
  (i) constructing a parallel dataset table of datasets based on the serial dataset table;
  (ii) constructing a parallel processing step table of statements based on the serial processing step table;
  (iii) constructing a dataset access table based on the serial dataset access table; and (iv) determining, for each processing step identified in the parallel processing step table, if a corresponding pre-defined parallelization rewrite rule exists for such processing step, and if so, then applying the corresponding pre-defined parallelization rewrite rule to redefine associated entries in the parallel dataset table, the parallel processing step table, and the dataset access table as parallel processing entries; and if not, then defining such associated entries as serial processing entries; and (c) constructing a parallel dataflow graph from the serial dataflow graph.

33. A system for parallelizing a computer application program based on a script of a script-driven software tool, comprising means and for automatically analyzing the script and means for producing a parallel computation specification based on such analysis, where such parallel computation specification provides functional equivalence to the script when executed by a parallel runtime system, including:

(a) means for parsing the script into statements;
(b) means for constructing a serial dataflow graph from the parsed statements, said means including means for
(i) constructing a serial dataset table of datasets used by the script;
(ii) constructing a serial processing step table of statements performed by the script; and
(iii) constructing a serial dataset access table indicating datasets in the dataset table used by statements in the processing step table; and
(c) means for constructing a parallel dataflow graph from the serial dataflow graph.

34. A system for parallelizing a computer application program based on a script of a script-driven software tool, comprising means and for automatically analyzing the script and means for producing a parallel computation specification plus a script fragment set based on such analysis, where such parallel computation specification and script fragment set provides functional equivalence to the script when executed by a parallel runtime system, including:

(a) means for parsing the script into statements;
(b) means for constructing a serial dataflow graph from the parsed statements, said means including means for
(i) constructing a serial dataset table of datasets used by the script;
(ii) constructing a serial processing step table of statements performed by the script; and
(ii) constructing a serial dataset access table indicating datasets in the dataset table used by statements in the processing step table; and
(c) means for constructing a parallel dataflow graph from the serial dataflow graph.

35. A system for parallelizing a computer application program based on a script of a script-driven software tool, comprising means and for automatically analyzing the script and means for producing a parallel computation specification based on such analysis, where such parallel computation specification provides functional equivalence to the script when executed by a parallel runtime system, including:

(a) means for parsing the script into statements;
(b) means for constructing a serial dataflow graph from the parsed statements, said means including means for
(i) constructing a parallel dataset table of datasets based on the serial dataset table;
(ii) constructing a parallel processing step table of statements based on the serial processing step table;
(iii) constructing a dataset access table based on the serial dataset access table; and
(iv) determining, for each processing step identified in the parallel processing step table, if a corresponding pre-defined parallelization rewrite rule exists for such processing step, and if so, then applying the corresponding pre-defined parallelization rewrite rule to redefine associated entries in the parallel dataset table, the parallel processing step table, and the dataset access table as parallel processing entries; and if not, then defining such associated entries as serial processing entries; and
(c) means for constructing a parallel dataflow graph from the serial dataflow graph.

36. A system for parallelizing a computer application program based on a script of a script-driven software tool, comprising means and for automatically analyzing the script and means for producing a parallel computation specification plus a script fragment set based on such analysis, where such parallel computation specification and script fragment set provides functional equivalence to the script when executed by a parallel runtime system, including:

(a) means for parsing the script into statements;
(b) means for constructing a serial dataflow graph from the parsed statements, said means including means for
(i) constructing a parallel dataset table of datasets based on the serial dataset table;
(ii) constructing a parallel processing step table of statements based on the serial processing step table;
(iii) constructing a dataset access table based on the serial dataset access table; and
(iv) determining, for each processing step identified in the parallel processing step table, if a corresponding pre-defined parallelization rewrite rule exists for such processing step, and if so, then applying the corresponding pre-defined parallelization rewrite rule to redefine associated entries in the parallel dataset table, the parallel processing step table, and the dataset access table as parallel processing entries; and if not, then defining such associated entries as serial processing entries; and
(c) means for constructing a parallel dataflow graph from the serial dataflow graph.

* * * * *